(12) United States Patent
Dean et al.

(10) Patent No.: US 10,503,784 B1
(45) Date of Patent: Dec. 10, 2019

(54) CONTROL INTERFACE FOR ASSET TREE MONITORING

(71) Applicant: Splunk Inc., San Francisco, CA (US)

(72) Inventors: Erick Anthony Dean, Piedmont, CA (US); Brian Matthew Gilmore, Alameda, CA (US)

(73) Assignee: Splunk Inc., San Francisco, CA (US)

( * ) Notice: Subject to any disclaimer, the term of this patent is extended or adjusted under 35 U.S.C. 154(b) by 531 days.

(21) Appl. No.: 15/224,637

(22) Filed: Jul. 31, 2016

(51) Int. Cl.
*G06F 16/90* (2019.01)
*G05B 19/40* (2006.01)
*G06F 16/901* (2019.01)
*H04L 29/08* (2006.01)
*G05B 19/4063* (2006.01)
*G06F 16/26* (2019.01)
*G06F 16/248* (2019.01)
*G06F 16/9535* (2019.01)

(52) U.S. Cl.
CPC ..... *G06F 16/9027* (2019.01); *G05B 19/4063* (2013.01); *G06F 16/248* (2019.01); *G06F 16/26* (2019.01); *G06F 16/9017* (2019.01); *G06F 16/9535* (2019.01); *H04L 67/10* (2013.01); *G05B 2219/32404* (2013.01)

(58) Field of Classification Search
CPC ........ G06F 17/30961; G06F 17/30554; G06F 17/30572; G06F 17/30867; G06F 17/30952; G05B 19/4063; G05B 2219/32404; H04L 67/10
See application file for complete search history.

(56) References Cited

U.S. PATENT DOCUMENTS

| 6,510,420 | B1 * | 1/2003 | Cessna | G06Q 10/06 |
| | | | | 706/45 |
| 9,980,205 | B2 * | 5/2018 | Meredith | H04W 48/10 |
| 2015/0019537 | A1 * | 1/2015 | Neels | G06F 16/338 |
| | | | | 707/722 |
| 2017/0039038 | A1 * | 2/2017 | Huber | G06F 8/34 |
| 2017/0090467 | A1 * | 3/2017 | Cincea | H04L 43/0805 |

\* cited by examiner

*Primary Examiner* — Kenneth M Lo
*Assistant Examiner* — Mohammad A Rahman
(74) *Attorney, Agent, or Firm* — Law Office of Thomas L. Treffert

(57) ABSTRACT

An asset monitoring and reporting system (AMRS) implements an interface to establish an asset hierarchy to be monitored and reported against. The interface employs a search query of extant asset data from which definitional aspects of the asset hierarchy can be identified, and therefrom the interface automatically determines control information reflective of the asset hierarchy to direct the ongoing operation of the AMRS.

30 Claims, 27 Drawing Sheets

Original Search: 802
Search "error" | stats count BY host
804
Sent to peers:
Search "error" | prestats count BY host
806
Executed by search head:
Aggregate the prestats results received from peers

FIG. 13

CONTROL INTERFACE FOR ASSET TREE MONITORING

TECHNICAL FIELD

The present disclosure relates to automatic system monitoring apparatus, more particularly, to asset tree monitoring.

BACKGROUND

Modern operational systems often comprise large numbers of assets about which machine data is generated by the assets themselves or other systems and components that generate information about the asset. As the number, complexity, and sophistication of such asset-based systems, and the volume of machine data generated by and about them, increases, processing large volumes of machine-generated and machine-mediated data in an intelligent manner and effectively presenting the results of such processing continues to be a priority.

BRIEF DESCRIPTION OF THE DRAWINGS

In the drawings:

FIG. 13 illustrates a user interface display of a console function for specifying data inputs.

DETAILED DESCRIPTION

Figure 1:
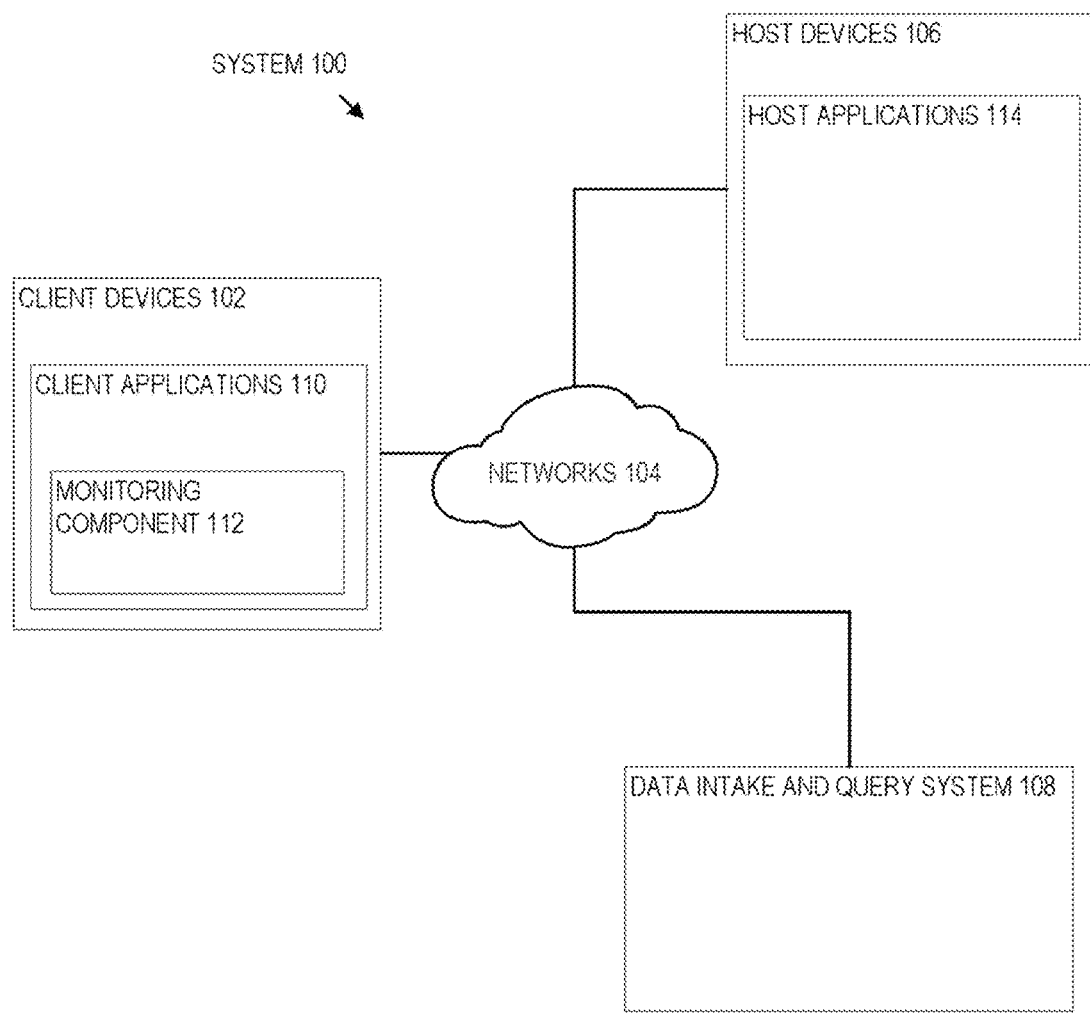
FIG. 1 illustrates a networked computer environment in which an embodiment may be implemented.

Modern data centers and other computing and automation environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104.

Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they may be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
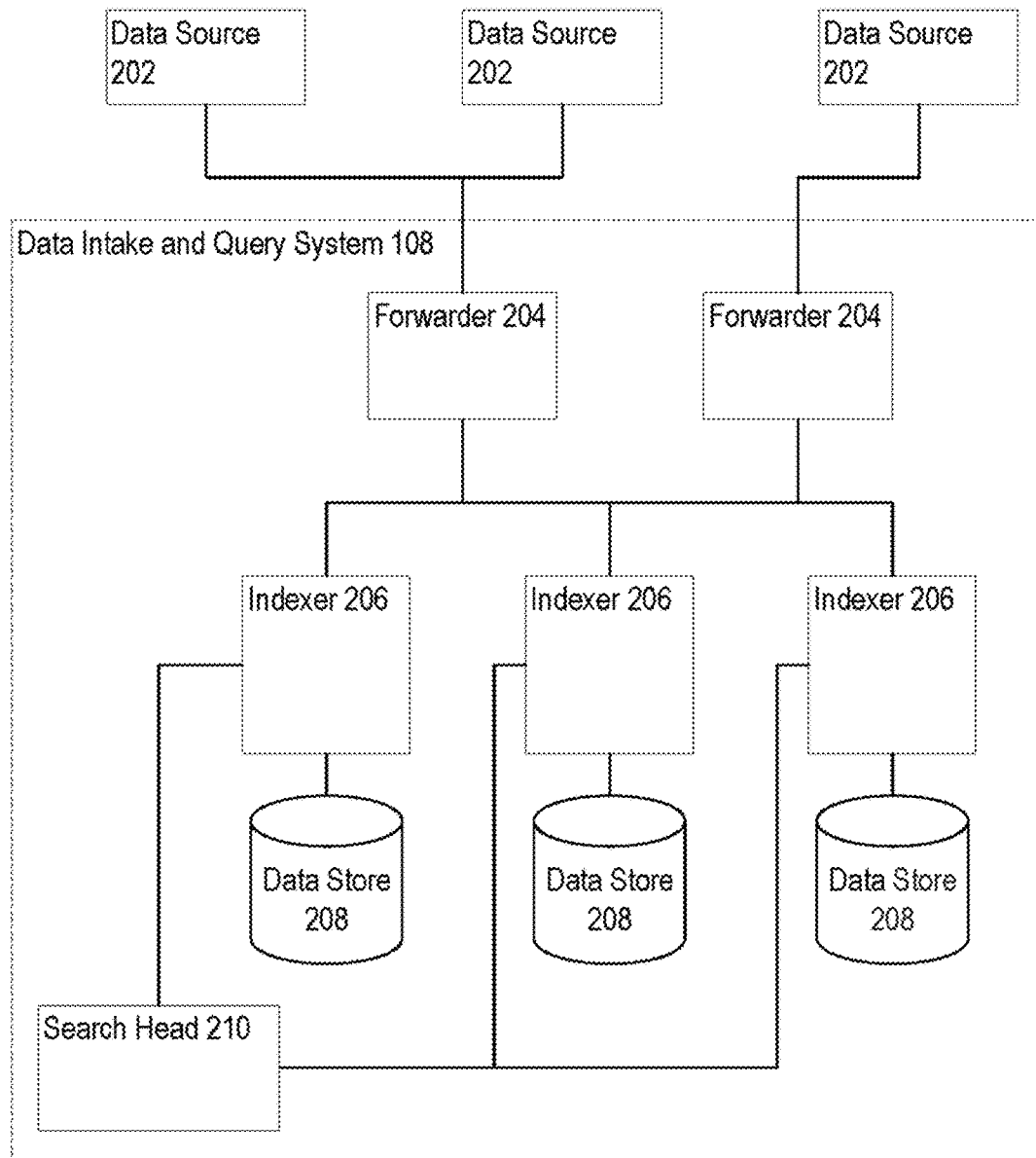
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
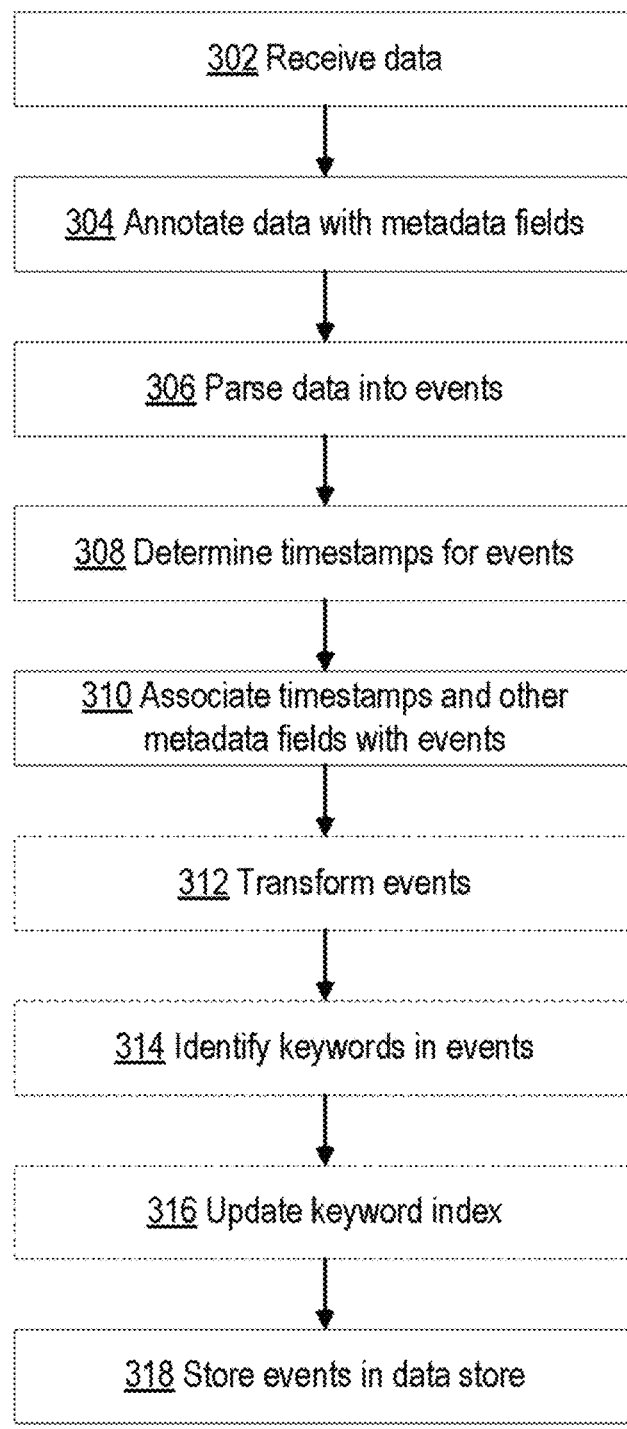
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
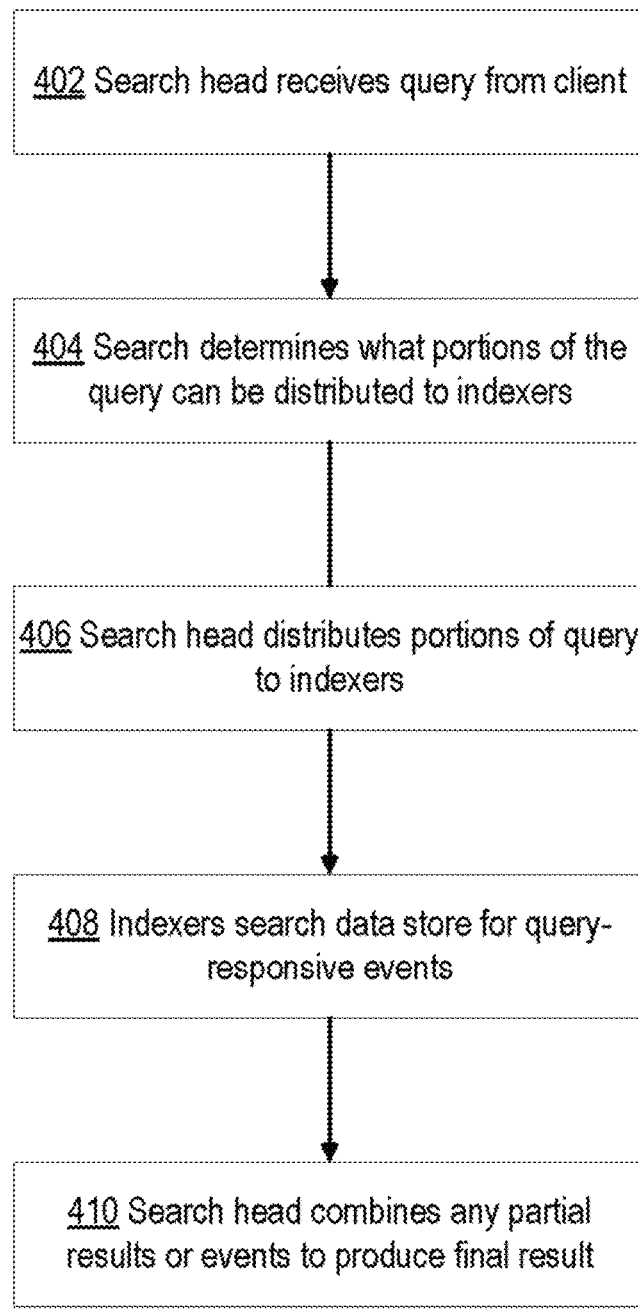
FIG. 4 is a flow diagram that illustrates how a search head and indexers perform a search query in accordance with the disclosed embodiments.

FIG. 4 is a flow diagram that illustrates an examplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
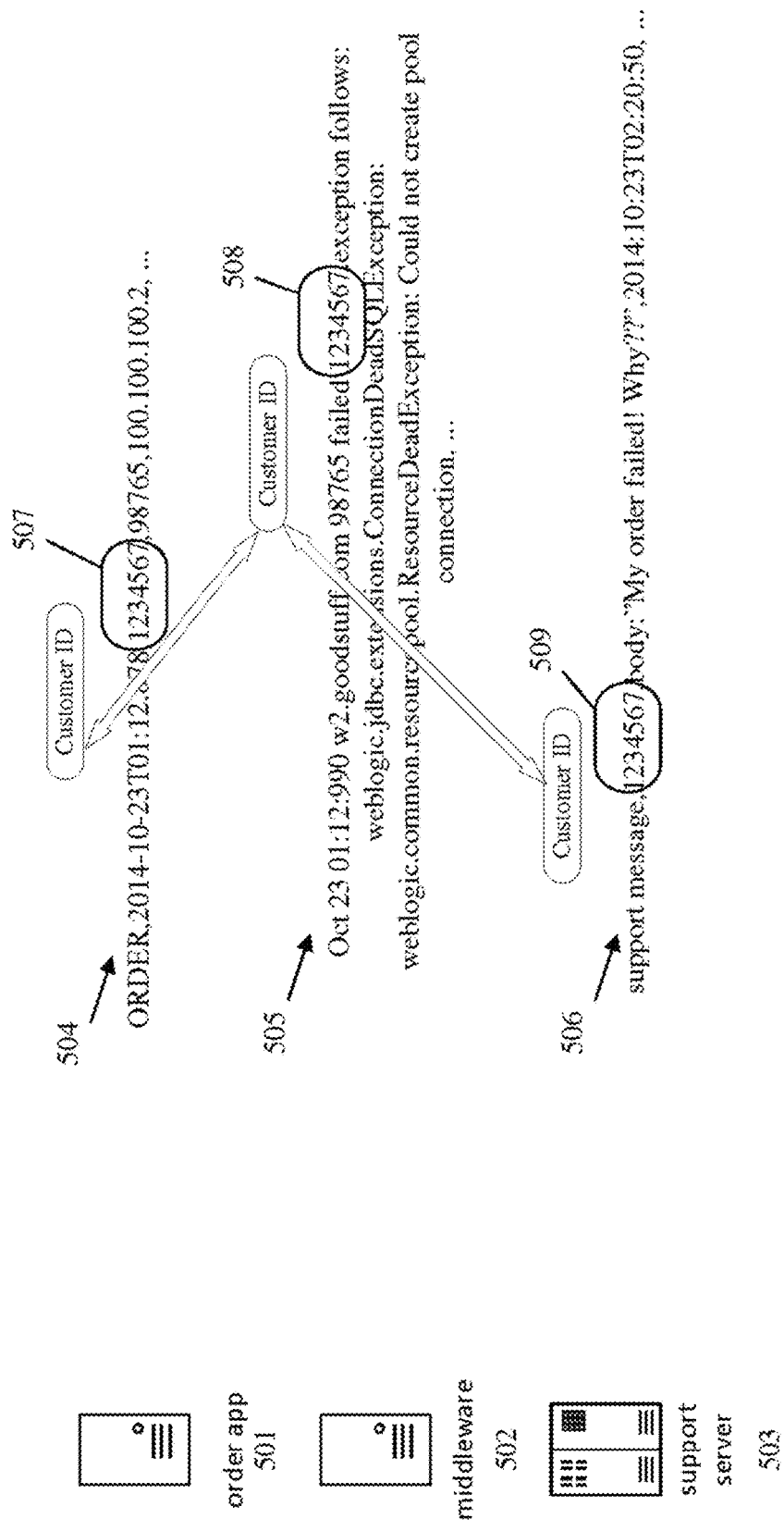
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
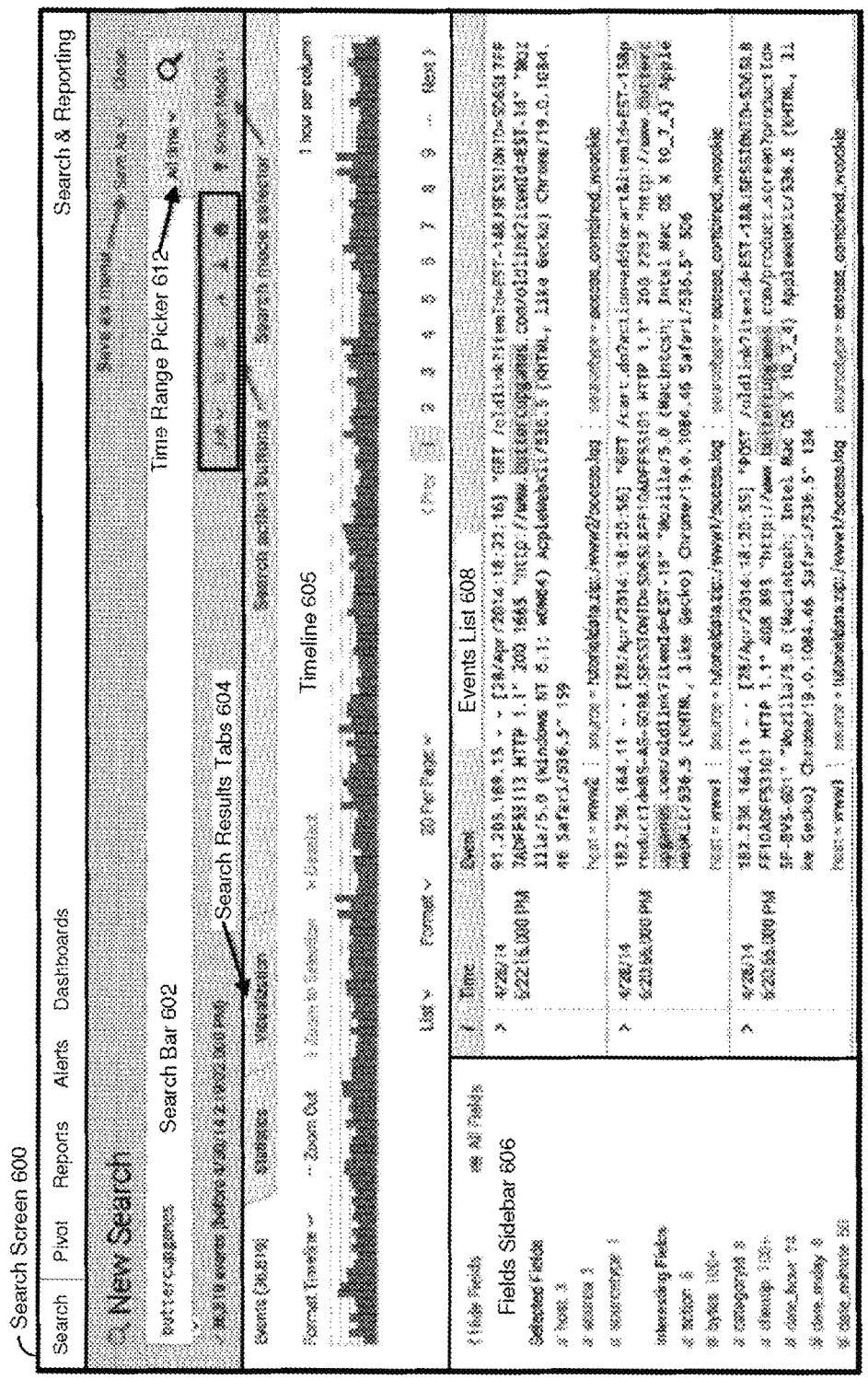
FIG. 6A illustrates a search screen in accordance with the disclosed embodiments.
Figures 6B, 7:
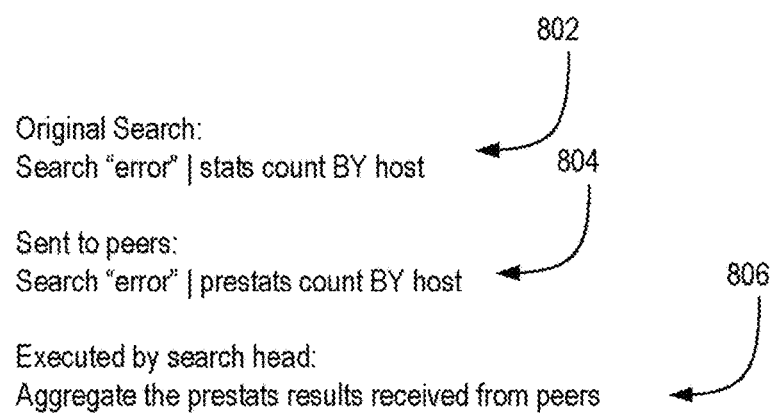
FIG. 6B illustrates a data summary dialog that enables a user to select various data sources in accordance with the disclosed embodiments.
FIG. 7 illustrates an example search query received from a client and executed by search peers in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and published as US Patent Application Publication 2015-0019537A1 on Jan. 15, 2015, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

To facilitate faster query processing, a query can be structured such that multiple indexers perform the query in parallel, while aggregation of search results from the multiple indexers is performed locally at the search head. For example, FIG. 7 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014 and issued as U.S. Pat. No. 9,128,985 on Sep. 8, 2015, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 8:
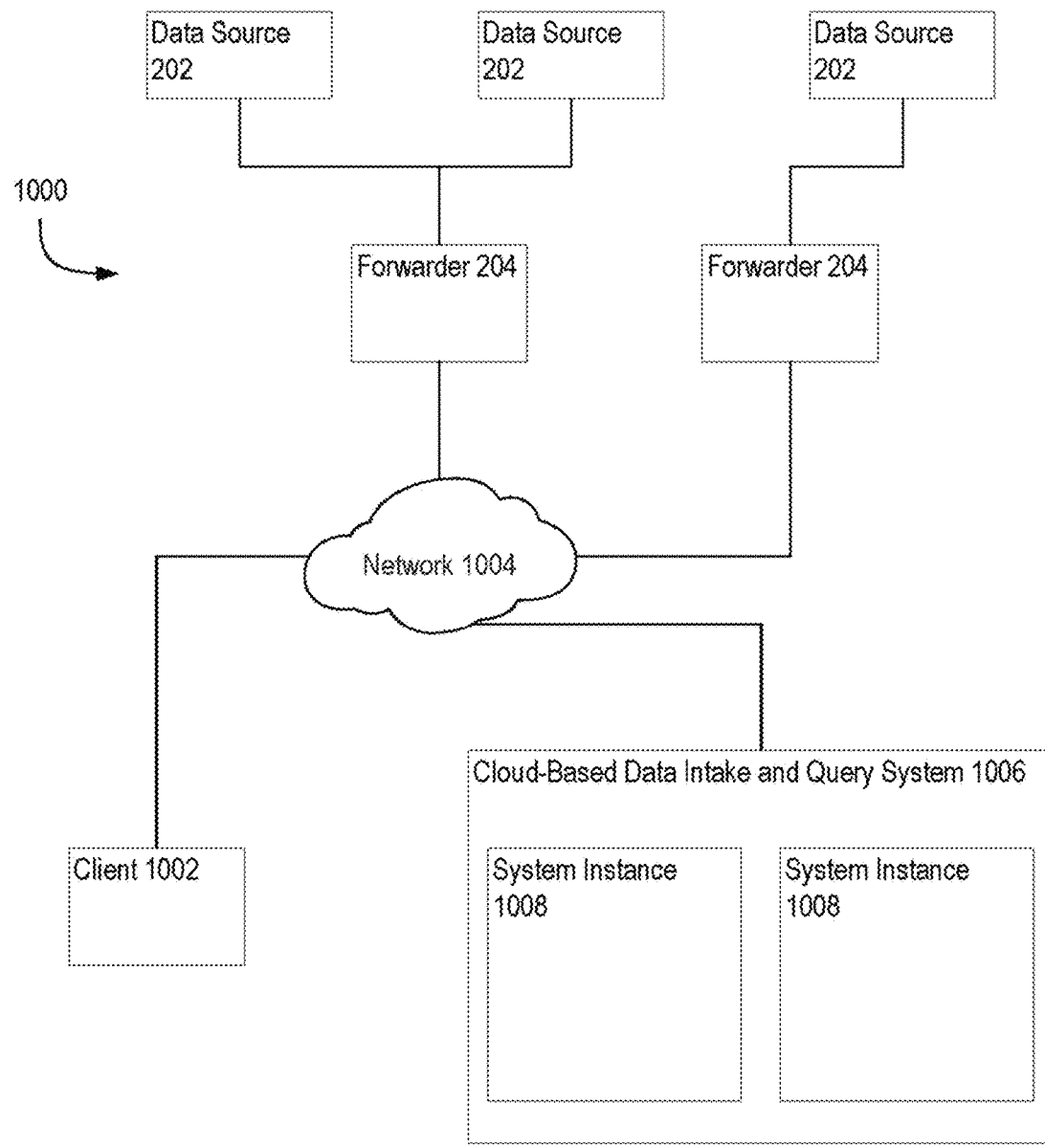
FIG. 8 illustrates a block diagram of an example cloud-based data intake and query system in which an embodiment may be implemented.

FIG. 8 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 9:
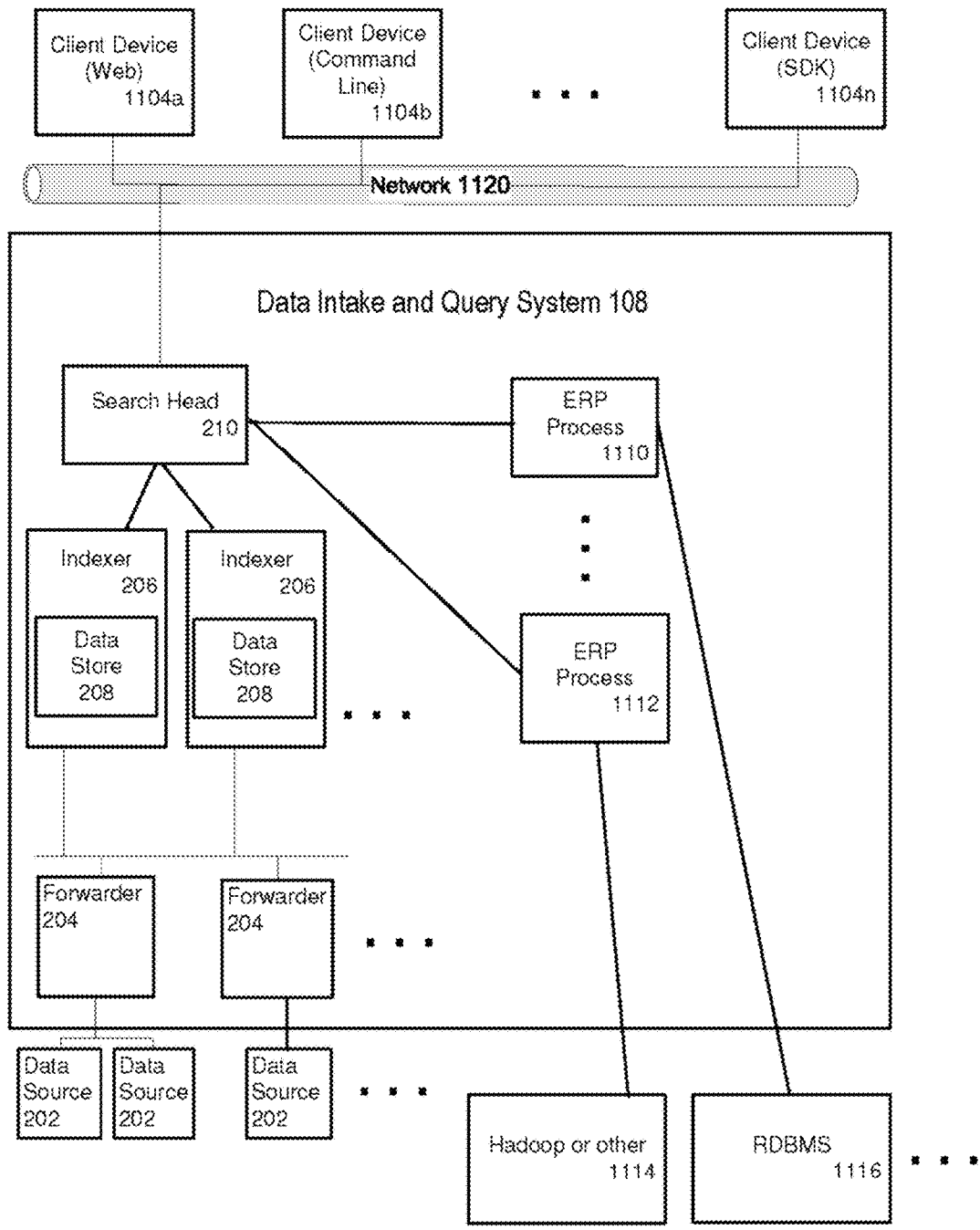
FIG. 9 illustrates a block diagram of an example data intake and query system that performs searches across external data systems in accordance with the disclosed embodiments.

FIG. 9 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 9 illustrates that multiple client devices 1104a, 1104b, . . . , 1104n may communicate with the data intake and query system 108. The client devices 1104 may communicate with the data intake and query system using a variety of connections. For example, one client device in FIG. 9 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 9 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the] streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One examplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3. Asset Hierarchy Monitoring and Reporting System

Aspects of embodiments heretofore described may be advantageously implemented with subject matter next discussed to provide novel embodiments related to the monitoring and reporting for an asset hierarchy. Inventive subject matter will become manifest through the description and discussion of an asset hierarchy monitoring and reporting system. The disclosed system operates automatically to receive, collect, or ingest computer readable data as might the relevant to one or more assets in the asset hierarchy, and operates automatically to perform processes or methods that operate against the data to provide effective monitoring and reporting for the asset hierarchy. The disclosed system has its operation controlled by certain command, control, and configuration (CCC) information, in computer storage. The disclosed system may implement a control console function to enable a system user or administrator to create, view, and edit CCC information as necessary to determine the operation of the asset hierarchy monitoring and reporting system (AMRS).

In one aspect of the disclosed embodiments, collections of data accessible via a DIQ are queried via a control console interface with results reported to the user. The user may interactively optimize the search and classify certain information in the results. Using the optimized query and information classifications, command console functions can proceed to automatically construct an asset hierarchy that, as part of the CCC information, may determine future asset hierarchy monitoring and reporting operations. This computer aided and implemented bottom-up construction of an asset hierarchy from volumes of data as may be extant in a DIQ system represents a vast improvement over an asset monitoring system implementation that requires manual determination of an asset hierarchy in a top-down approach, perhaps through laborious ETL (extract/transform/load) efforts, schema developments, and the like. Actual machine data reflecting the real-life asset hierarchy is harvested to derive the asset hierarchy definition for monitoring and reporting operations moving forward rather than requiring the administrative definition of asset hierarchy constructs to which relevant data can then be associated if the constructs are correct and the data conforms.

3.1 System Overview

Figure 10:
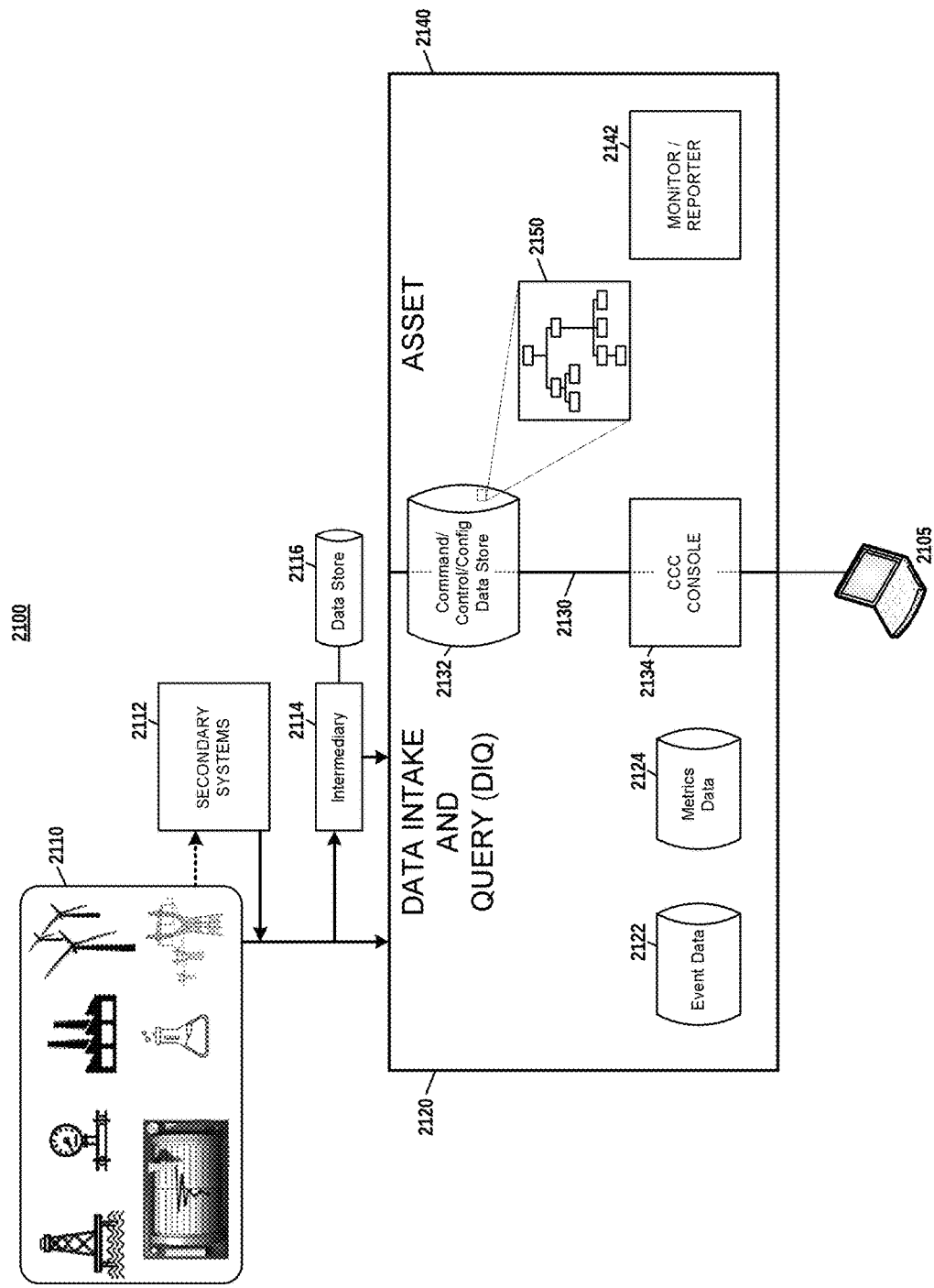
FIG. 10 illustrates an asset hierarchy monitoring and reporting system deployment in one embodiment.

FIG. 10 illustrates an asset hierarchy monitoring and reporting system deployment in one embodiment. Block diagram 2100 includes assets and asset data generators 2110, secondary systems 2112, intermediary data system 2114, intermediary data store 2116, data intake and query system (DIQ) 2120, asset monitoring and reporting system (AMRS) 2140, and user interface apparatus 2105. DIQ 2120 is shown further to include event data store 2122, metrics data store 2124, command, control, and configuration (CCC) data store 2132 (independently or shared with AMRS 2140), and CCC console processor 2134 (independently or shared with AMRS 2140). AMRS 2140 is shown further to include command, control, and configuration (CCC) data store 2132 (independently or shared with DIQ 2120), CCC console processor 2134 (independently or shared with DIQ 2120), monitor/reporter processor 2142, and asset hierarchy information 2150 shown to be included within its CCC data store 2132.

Assets and asset data generators 2110 may include real-world physical assets for which monitoring and/or reporting are desired. Examples may include active and passive items, structures, machinery, components, devices, parts, assemblies, and interconnections therefore, as may be utilized for an oil drilling platform, a transmission pipeline, a factory or assembly line, an electrical generation facility (e.g., a windmill farm, hydroelectric plant, or nuclear generation facility), an electrical transmission facility or grid, a sensor deployment (e.g., seismographic stations, weather stations, oceanographic sensor buoys, GPS trackers), a satellite network, a chemical processing lab or facility, a distribution of Internet-of-Things (IoT) devices, a vehicle, a hospital, a region, or a person, to name but a few examples. An asset may generate data about itself or about another asset, implicitly or explicitly, as part of its principal operation and functioning, or as part of built-in monitoring and diagnostic capabilities. An asset may be a discrete asset, such as a temperature probe or other sensor, or may be a collection of other assets and/or other collections of assets, such as a distribution pipeline asset which is made up of multiple regional distribution segments, which are each made up of many pipes, valves, pumps, sensors, and so on, and the like. In terms of asset monitoring and reporting, an asset may also be an information asset, such as a single endpoint reading from a set of multiple different readings produced by a single sensor device. While many types of assets are possible, the assets and asset data generators 2110 in a particular embodiment, implementation, application, installation, or instance, may include the assets that commonly belong to a system or domain to be monitored, such as a nationwide common carrier fleet, one or more of a company's manufacturing plants, an early warning sensor network, or a municipality's sewer treatment and water filtration plant. Information produced by or about assets may be communicated directly or indirectly via some arrangement or combination of data polling, receiving, consolidating, concentrating, integrating, collecting, forwarding, filtering, and processing devices, and the like, such as a process control computer at a manufacturing plant, which may itself be an asset; and producing asset information by such devices may simply involve the presentation or transmission of asset information without creating or originally generating it. Regardless, the asset information appears at the intake side of the data intake and query system 2120. The arriving data for a system or domain may likely appear in different forms, in different patterns, at different times, with different timing factors, structured and unstructured (e.g., freeform, textual, variable length, etc.), crude and processed, simplex and complex, standards-conforming and not, via multiple communication means, modes, and methods, for ingestion by the DIQ system 2120. Additional asset-related information may be injected into the conceptual flow of data to the DIQ by secondary systems such as 2112. Secondary systems 2112 may include, for example, the service billing system of an outside contractor that reports repairs to assets of 2110. Secondary systems 2112 may or may not be linked electronically to the assets of 2110 but, nonetheless, may produce information related to those assets which may be ingested by DIQ 2120. Further, block diagram 2100 illustrates that information in the conceptual flow from the system/domain assets 2110 to DIQ 2120, may arrive at the DIQ directly or via an intermediary data system such as 2114. In one embodiment, intermediary data system 2114 may act, for example, as a pass-through, information aggregating device. In one embodiment, intermediary data system 2114 may act, for example, as a store-and-forward device that accumulates asset information in data store 2116 before forwarding it on to DIQ 2120 according to its operation and programming. In one embodiment, intermediary data system 2114 may be, for example, and OPC/UA server using standard protocols to collect asset information which it may later provide to DIQ 2120. Intermediary data systems such as 2114 may be relatively dumb devices in the sense of performing only rudimentary operations on their input data, sending it back out largely unchanged from how it was received. Intermediary data systems such as 2114 may be relatively smart devices in the sense of performing more advanced operations on their input data, sending it back out in a possibly highly processed form from that which was received. Many embodiments are possible.

Whether originating from assets or asset data generators of 2110, or from secondary systems 2112, and whether arriving directly or via an intermediary system such as 2114, asset-related data arrives at data intake and query 2120 for intake, ingestion, searching, monitoring, reporting, and/or other processing. In an embodiment, DIQ system 2120 may well be an implementation of a data intake and query system such as system 108 as shown and discussed in relation to FIGS. 1, 2, and 9, or system 1006 as shown and discussed in relation to FIG. 8. In one embodiment, where DIQ system 2120 is implemented after the fashion of DIQ system 108 of FIG. 9, asset data for 2110 of FIG. 10 may include one or more data sources (202 of FIG. 9) coupled to one or more forwarders (204 of FIG. 9). In such an embodiment, asset data for 2110 of FIG. 10 may include one or more data sources, perhaps intermediary system 2114, coupled to one or more ERP processes (e.g. 1110, 1112 of FIG. 9). Many arrangements and combinations are, of course, possible in light of the disclosure herein.

In an embodiment, asset data received for intake by DIQ 2120 of FIG. 10 may arrive at event data store 2122, which may be implemented as an indexed data store such as data store 208 of FIG. 2. In an embodiment, asset data received for intake by DIQ 2120 of FIG. 10 may arrive at a metrics data store 2124. Metrics data store 2124 may be implemented by DIQ 2120 as an alternative or supplementary data storage regime to event data store 2122 and may have superior performance aspects when processing large volumes of, or data chiefly consisting of, metrics data. The operation of DIQ 2120 to perform intake and subsequent processing of the received asset data is controlled by information in command/control/configuration data store 2132. CCC console 2134 effectively implements the control panel for the system by providing user interfaces and related processing that enable user, such as a system administrator or operator, to view, create, edit, delete, or otherwise process or manipulate the information in this CCC data store 2132 that controls the operation of the system. CCC console 2134 may cause the display of a user interface on a dedicated console device or on a multi use device such as a network attached user computer as depicted by 2105 of FIG. 10. CCC data store 2132 and console processor 2134 may be shared in whole or part by DIQ 2120 and asset system 2140, as depicted in FIG. 10 by the straddling of the boundary 2130 between the two. Shared boundary 2130 illustrates the coupling between the functionality described for each of DIQ 2120 and asset system 2140. While DIQ 2120 and asset system 2140 are depicted and described as distinct components in block diagram 2100 one of skill can appreciate that implementations may vary. In one embodiment, DIQ 2120 and asset system 2140 are distinct systems, running on distinct platforms, that do not share CCC data store 2132 or CCC console processor 2134, and that are coupled by defined interfaces communicating over generalized network facilities. In one embodiment, DIQ 2120 and asset system 2140 are completely integrated and installed or formed together as a single unit. In one embodiment, software of DIQ 2120 may be installed separately and in advance of asset system 2140 software, and asset system software may be packaged for installation as an application or subsystem of DIQ 2120. Accordingly, distinctions illustrated and described here represent logical distinctions that are useful to convey an understanding of inventive aspects but do not impose limitations on the practice of those aspects.

Like data intake and query system 2120, the operation of asset system 2140 is directed and determined by certain information in a command, control, and configuration data store such as 2132. If asset system 2140 does not share CCC data store 2132 with DIQ 2120, it may have its own. Similarly, if asset system 2140 does not share console processor 2134 with DIQ 2120, it may have its own, which may nonetheless utilize user interface device 2105 for displaying interactive user interfaces. Information of CCC data store 2132 for asset system 2140 is shown to include information defining and representing an asset hierarchy 2150. Asset hierarchy definition 2150 is a logical construct that may be implemented as one or more data structures, having one or more formats, stored at one or more locations, across one or more device types. Sufficient information exists in the stored representation of asset hierarchy definition 2150, directly or indirectly, expressed or implied, to enable a computing machine arrangement to operate in accordance with the logical asset hierarchy definition 2150.

Monitor/reporter 2142 of asset system 2140 utilizes asset hierarchy definition 2150 and perhaps other information in CCC data store 2132 to direct, determine, condition, or otherwise influence its operation to effect monitoring and/or reporting related to one or more assets included in an asset hierarchy. The activity of monitor/reporter 2142 may be variously performed as continuous, intermittent, scheduled, or on-demand processing. Such monitoring and/or reporting activity may produce outputs immediately intended for human consumption, such as a status display user interface presented on a user interface device such as 2105, or outputs immediately intended for machine use, such as an event record recorded to the event data 2122 of DIQ 2120 in response to detecting a condition during ongoing analysis of incoming asset data. Monitor/reporter 2142 may perform any of its functional processing directly or may interface with other systems and/or subsystems, such as DIQ 2120, to have certain functional processing performed. These and other embodiments are possible.

In an embodiment, DIQ 2120 and asset system 2140 may be implemented as dedicated hardware, dedicated computing hardware programmed with software, general purpose and/or mixed-use computing hardware specialized with software to implement operation as a DIQ and asset system, or the like, alone or in combination.

Figure 11A:
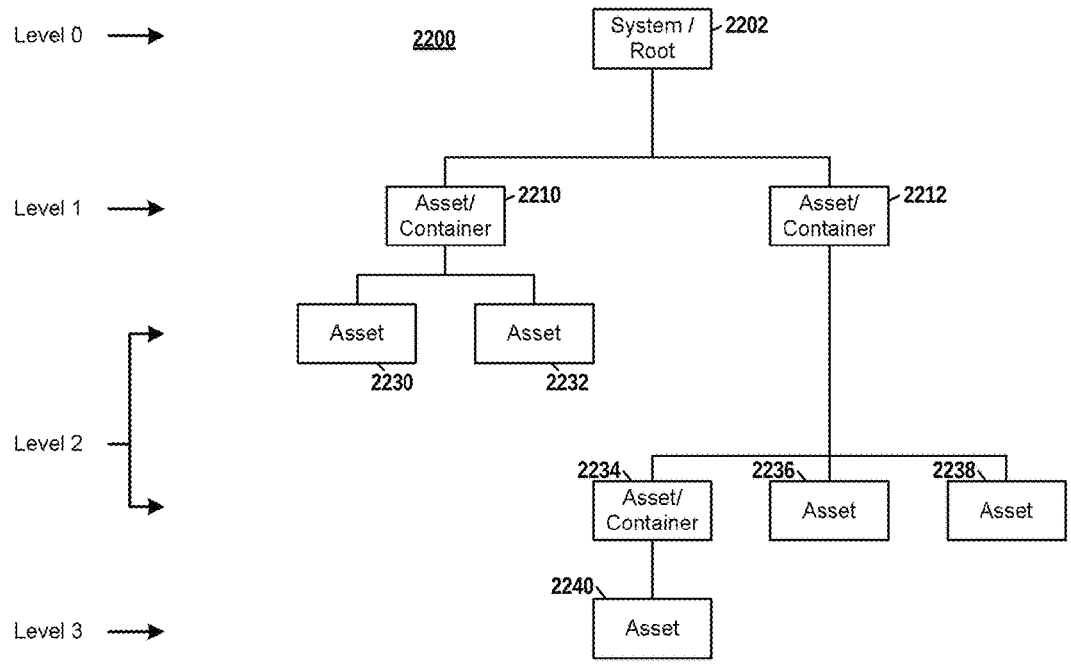
FIGS. 11A and 11B illustrate an illustrative asset hierarchy structure.
Figure 11B:
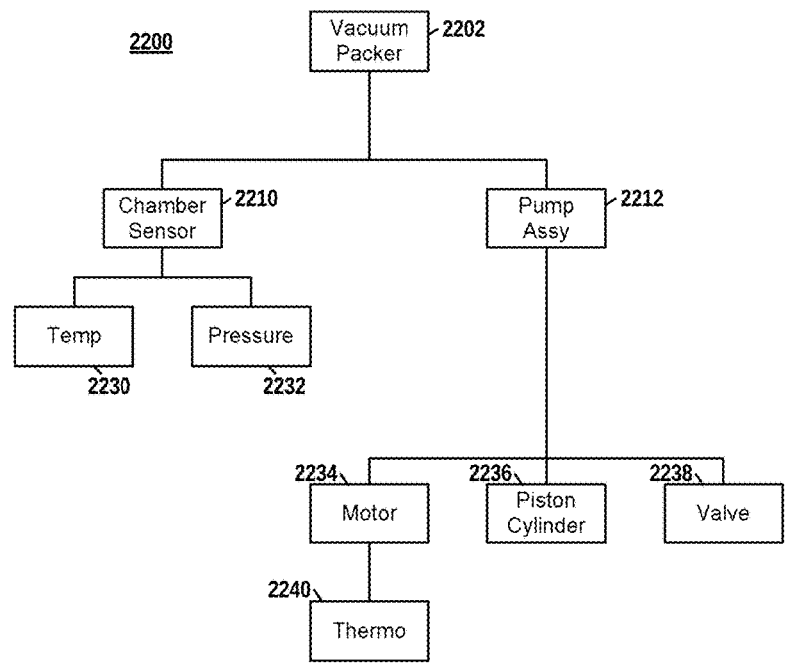

FIGS. 11A and 11B illustrate an illustrative asset hierarchy structure. FIGS. 11A and 11B depict the same example asset hierarchy structure, that is to say, the same set of nodes with the same set of interrelationships. FIG. 11A, however, labels each node according to its role while FIG. 11 B labels each node according to one illustrative physical world example. Hierarchical node 2202 is designated as the system or root node and is the only node of hierarchy 2200 that does not have a parent node (does not descend from a superior node). Root node 2202 may or may not represent a unitary physical asset, and often may not, but in any event may represent the aggregation or collection of all that is represented in the hierarchy of nodes descending from it. In an embodiment, every asset tree or hierarchy may have a system or root node, and the system or root node may serve as a principal entry point for navigating the hierarchy and for identifying the hierarchy. The system or root node may represent the system, domain, physical asset, category, location, owner, or other characteristic, designation, or construct, that may unify all that is represented in the hierarchy of nodes descending from it. In an embodiment, the root node of an asset hierarchy may represent the system against which monitoring and/or reporting may be conducted, such as a water filtration system. In an embodiment, the root node of an asset hierarchy may represent the domain of assets against which monitoring and/or reporting may be conducted, such as the Western region air-quality sensor stations. System/root node 2202 is shown to have two child (immediate descendent) nodes, 2210 and 2212, each of which has its own children. Nodes in hierarchy 2200 that have one or more child nodes are identified in FIG. 11A as asset/container nodes. (Systems/root node 2202 fits the criteria and may be considered an asset/container node though not labeled as such.) An asset/container node may represent a physical construct having subordinate assets such as a machine that has subassemblies and/or parts. An asset/container node may represent a logical construct having subordinate assets such as a category, class, or type of assets, such as "pumps" or "filters," and serves as a container or collection point for such assets. Asset/container node 2210 is shown to have two child nodes, 2230 and 2232, neither of which has any child node. Nodes in the asset hierarchy or tree that have no children are designated as leaf or terminal asset nodes. While a leaf or terminal asset node in the hierarchy may represent, for example, a physical object for which subordinate items, parts, sections, portions, subassemblies, data item/channels/streams, or the like, may indeed be capable of being identified, those subordinate elements may be effectively disregarded for monitoring and/or reporting purposes by the asset system because of their exclusion from the asset tree. Asset hierarchy 2200 is further shown to include three child nodes of asset/container node 2212: asset/container node 2234, and terminal asset nodes 2236 and 2238. Asset/container node 2234 is further shown to have child terminal asset node 2240.

Asset hierarchy 2200 may also be considered in terms of levels within its hierarchy. According to one paradigm, the levels of the hierarchy may be designated according to the number of steps a node is distanced from the root note. (A step may be considered to be the traversal of an internodal edge of the hierarchical graph.) System/root node 2202 of asset hierarchy 2200 occupies level 0 as it has no distance from itself. The direct children of system root node 2202, i.e. nodes 2210 and 2212, may be considered level 1 nodes as each is distanced one step from system/root node 2202. Each of the direct children of the level 1 nodes (the "grandchildren" of systems/root node 2202) may be considered a level 2 node as each is distanced two steps from system/root node 2202. Finally, in this example, leaf node 2240 may be considered a level 3 note as it is the direct child of a level 2 node (2234) and is distanced three steps from system/root node 2202 (a "great-grandchild").

FIG. 11B duplicates asset hierarchy structure 2200 from FIG. 11A, but now labeling each node according to a simplistic example to aid in understanding. In this example asset tree 2200 of FIG. 11B will represent a vacuum packing machine and, accordingly, root node 2202 is identified as "Vacuum Packer." The vacuum packer is shown to include immediate component assets, Chamber Sensor 2210 and Pump Ass[embl]y 2212. Chamber Sensor 2210 is shown to include Temp[erature] and Pressure assets, 2230 and 2232, each of which may represent a source, stream, channel, or component of measurement data for temperature and pressure metrics, respectively, produced by the chamber sensor device represented by node 2210. Pump assembly 2212 is shown to include immediate component assets motor 2234, piston cylinder 2236, and valve 2238, each of which in this example is suggested to represent a physical entity. Node 2234, and by representation the motor of the pump assembly of the vacuum packer, is shown to include immediate component asset "Thermo[switch]" 2240 which may represent an overheat switch (or its state/signal) that is built into the motor represented by node 2234.

Figure 12:
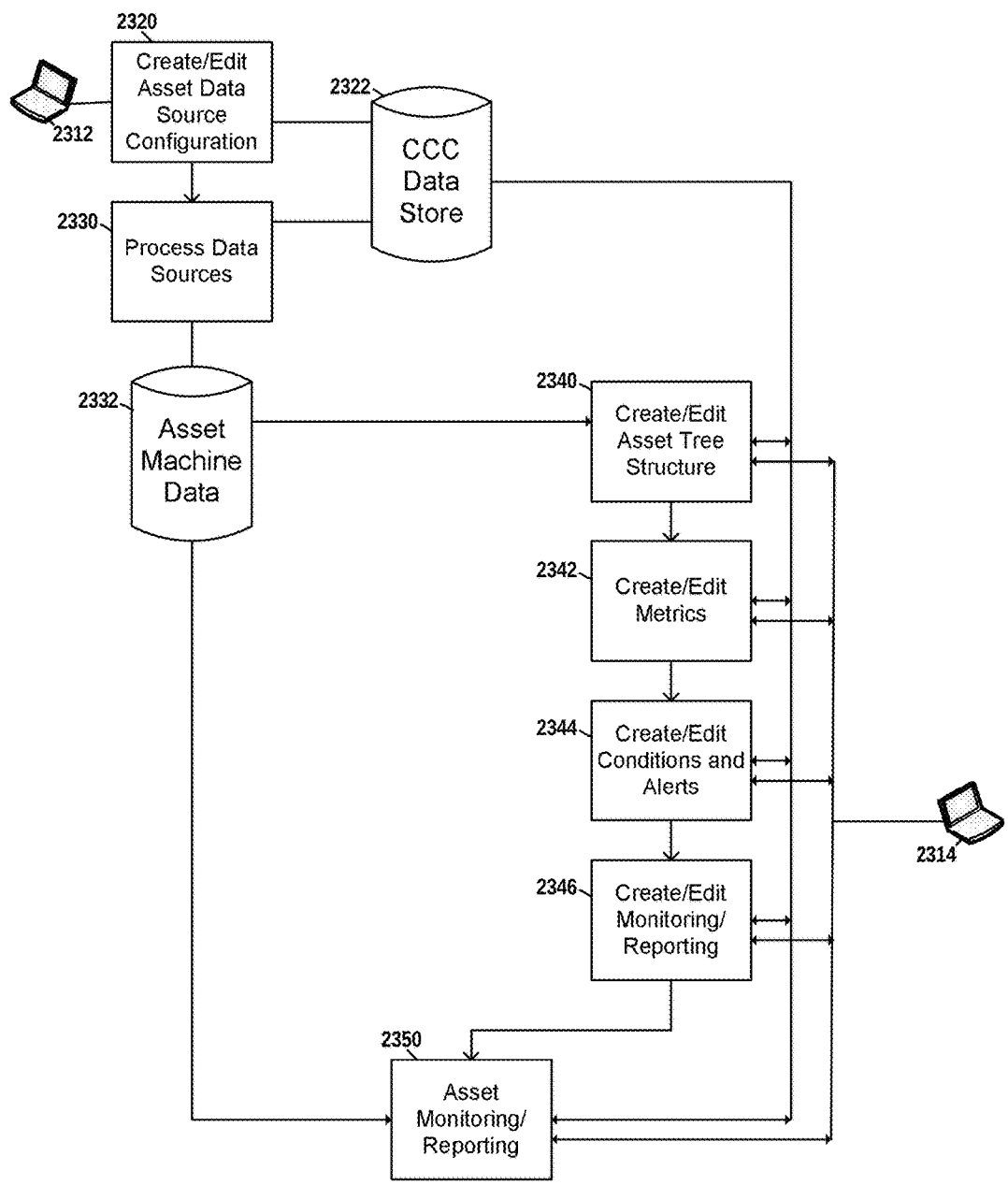
FIG. 12 illustrates methods of an asset hierarchy monitoring and reporting system in one embodiment.

FIG. 12 illustrates methods of an asset hierarchy monitoring and reporting system in one embodiment. The illustrated methods may represent a significant portion of the processing workflow to establish and operate an asset monitoring and reporting system (AMRS). Flowchart 2300 of FIG. 12 may beneficially be discussed in terms of an AMRS after the fashion illustrated in FIG. 10, such as an AMRS making combined use of functioning described for the data intake and query system 2120 and the asset system 2140 of FIG. 10.

At block 2320 of FIG. 12, the sources of asset-related data are configured so that DIQ functions can intake and process the data. The processing of block 2320 may include storing relevant information in command, control, and configuration (CCCO data store 2322. In an embodiment, such information may include data source definitions, data model information, field mappings and extraction rules, or the like, as may be useful to control the operation of the DIQ to intake and process, for storage and query, asset-related data from any number and variety of data sources. The processing of block 2320 may include causing the display of user interfaces on a user interface device, such as user computer 2312. The displayed user interfaces may be interactive, enabling a user to provide inputs to the processing of block 2320. In an embodiment user inputs may be content or indicators for data items, selections, commands, and such. The processing of block 2320 may utilize certain user inputs in the immediate context to condition, influence, or direct CCC console functions performed at block 2320, and may utilize the same or other certain user inputs to modify information in the CCC data store and thereby affect AMRS operation beyond the immediate context. As suggested, the method processing of block 2320 may be performed in an embodiment by a CCC console processor such as 2134 of FIG. 10. Block 2320 of FIG. 12 may utilize a user interface component such as user interface display 2400 of FIG. 13 in the course of its processing.

Figure 13:
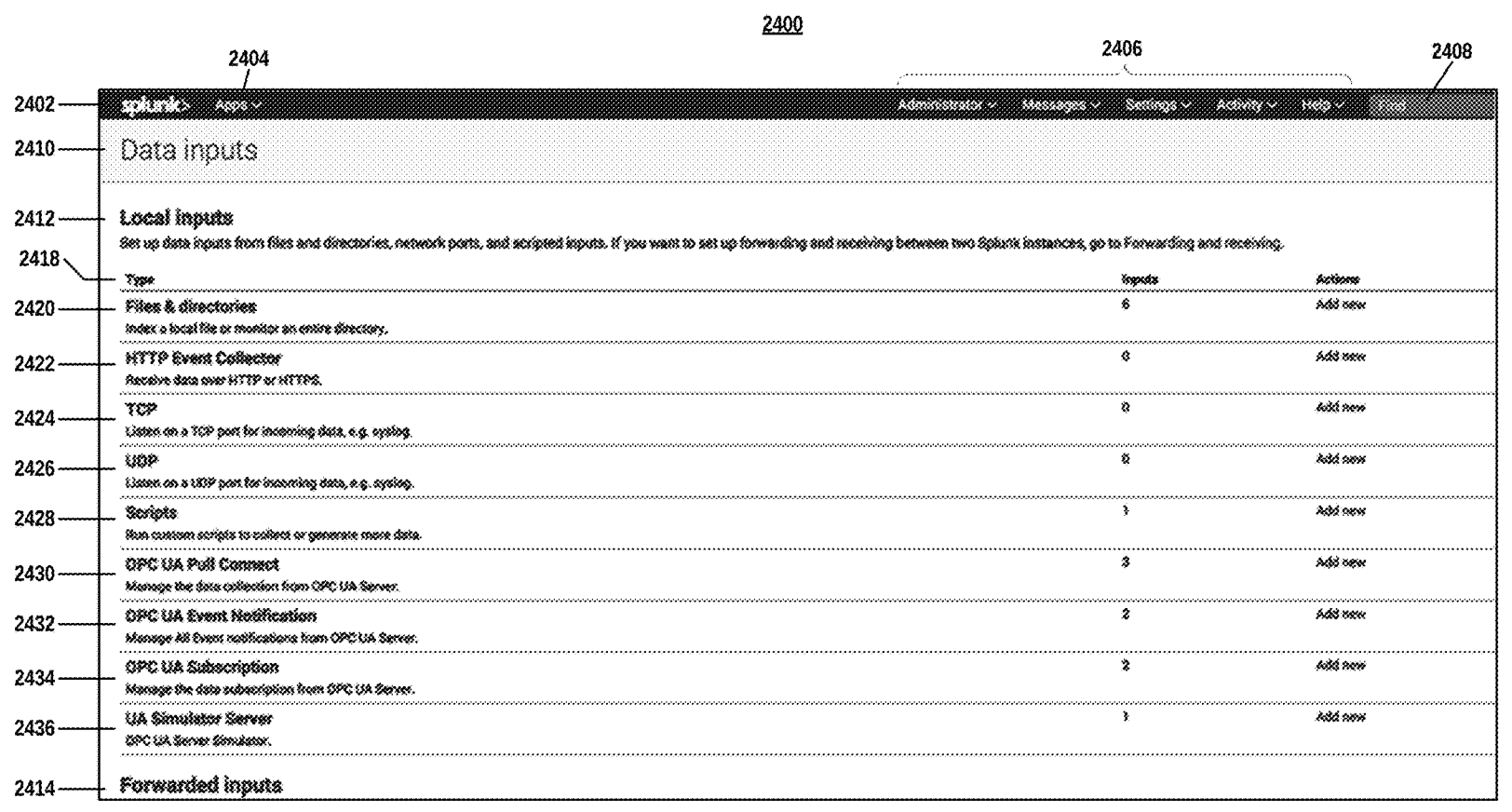

FIG. 13 illustrates a user interface display of a console function for specifying data inputs. Interface display 2400 is shown to include system header bar 2402 and header area 2410, followed by a detail display area. The system header bar 2402 is shown to include a system name, "splunk>", an application/function drop-down selection element 2404, a system menu area 2406, and a system search criteria entry box 2408. Header area 2410 is shown to include the title, "Data inputs", for the user interface. The detail display area is shown to include section headers 2412 and 2414 which may be used to identify and delineate different sections, portions, panels, or the like, of the detail display area. Section header 2412 identifies a "Local inputs" section of the detail display area which may include a tabular display identifying the types of local input data sources that may be defined to a DIQ in one embodiment. The tabular display of user interface 2400 includes column header row 2418 identifying "Type", "Inputs", and "Actions" columns. The "Actions" column for each row contains an "Add new" interactive element that enables a user to signal her desire to define a new data source/input for the DIQ of the type identified in the row. User interaction with the "Add new" interactive element may cause the display of, or navigation to, a user interface display component that enables a user to interact with the system for the addition of information to the CCC data store to effect processing for a new data input of the type identified in the row. The "Inputs" columns for each row contains a count of the number of already-defined data sources/inputs for the DIQ of the type identified in the row. At row 2420, the "Type" column includes an interactive identifier, "Files & directories", referring to data inputs/ sources that are files, or directories of files, in the file system of one or more host computers. In one embodiment, user interaction with a type identifier, such as "Files & directories", may result in the appearance of, or navigation to, a user interface display component that directly provides, or provides access to, one or more user interfaces for viewing, editing, deleting, or otherwise interacting with information of a CCC data store related to already-defined data sources/ inputs of the type identified in the row. At row 2422, the "Type" column includes an interactive identifier, "HTTP Event Collector", referring to data input/sources that are received over HTTP or HTTPS connections. At row 2424, the "Type" column includes an interactive identifier, "TCP", referring to data input/sources that are received over a listened-to TCP port. At row 2426, the "Type" column includes an interactive identifier, "UDP", referring to data input/sources that are received over a listened-to UDP port. At row 2428, the "Type" column includes an interactive identifier, "Scripts", referring to data input/sources that are executions of scripts or other programming that collect or generate data. At row 2430, the "Type" column includes an interactive identifier, "OPC UA Pull Connect", referring to data input/sources that are collected from an OPC/UA server. At row 2432, the "Type" column includes an interactive identifier, "OPC UA Event Notification", referring to data input/sources that are event notification received from an OPC/UA server. At row 2434, the "Type" column includes an interactive identifier, "OPC UA Subscription", referring to data input/sources that are subscribed from an OPC/UA server. At row 2436, the "Type" column includes an interactive identifier, "UA Simulator Server", referring to data input/sources that are received by an OPC/UA server simulation.

Without indicating any special significance or importance, it is noted that the OPC/UA data input types designated in rows 2430, 2432, 2434 and 2436, may be relevant to a large class of use cases for an asset monitoring and reporting system (AMRS) as described herein, as the types of installations and systems that utilize OPC/UA standards and protocols are the types of installations and systems having numbers of assets for which data is generated and for which robust monitoring and/or reporting can be beneficial. One large class of installations and/or systems having numbers of assets for which data is generated and for which robust monitoring and/or reporting can be beneficial, whether utilizing OPC/UA or not, are industrial installations and related industrial control systems. Such systems may include remote monitoring and control (M&C) systems designed to control large or complex facilities such as factories, power plants, network operations centers, airports, and spacecraft, with some degree of automation. Such a remote monitoring and control system may include a supervisory control and data acquisition (SCADA) system that operates with coded signals over communication channels to perhaps acquire information about the status of remote equipment and perhaps to issue coded command signals to remote equipment, possibly over large distances, and possibly using protocols and devices supporting OPC/UA. OPC/UA is well understood in the art as an industrial machine-to-machine (M2M) facility, and information regarding OPC/UA is promulgated by various means including the website found on the internet at the opcfoundation.org domain operated by the OPC Foundation, headquartered at 16101 N. 82nd Street, in Scottsdale, Ariz.

It is understood that in their role and to the extent they concern assets of an asset hierarchy, industrial control systems, including remote monitoring and control systems and SCADA systems, may perform their own monitoring and reporting regarding assets in an asset hierarchy. Such monitoring and reporting is distinct from the monitoring and reporting performed by an AMRS implementation as described and taught here, even while the one may provide data to the other.

At block 2330 of FIG. 12, data sources with asset-related data are processed by DIQ functions. The processing of block 2330 may access information of CCC data store 2322 to condition, control, direct, configure, or otherwise influence the intake and processing of the data from the data sources. Access to information of CCC data store 2322 may include access to information added or modified during the processing of block 2320. In an embodiment, processing of block 2330 may be initiated automatically (i.e., without user intervention) and may be performed in a continuous, periodic, regular, scheduled, timed, intermittent, or other such fashion automatically. In an embodiment, the processing of block 2330 may be performed on an on-demand basis. Processing of block 2330 may result in the reflecting of asset machine data in computer storage of any number and variety of types. The processing of block 2230 may be performed by a DIQ, such as 2120 of FIG. 10. The asset machine data 2332 of FIG. 12 may be stored as event data 2122 and/or as metrics data 2124 of DIQ 2120 of FIG. 10, for example, in an embodiment.

At block 2340 of FIG. 12, an asset tree structure may be created or edited. If an asset tree structure is being created, block 2340 may present the user with an interface for specifying or indicating one or more items, aspects, characteristics, options, selections, or such, for the creation of a new asset tree by the processing of block 2340. In an embodiment, such an interface may include default values or selections for some or all of the information the interface enables a user to indicate or supply. If an asset tree structure is being edited, information of an existing asset tree in CCC data store 2322 may be directly or indirectly represented in a display to a user via an interactive interface. The user may provide inputs via the user interface. Such user inputs may be used by the processing of block 2340 to construct a proper representation of a new or updated asset tree, and a representation of the new or updated asset tree may be reflected in the information of CCC data store 2322. User interface displays of the processing of block 2340 may be caused to be displayed on a user interface device such as user computer 2314, for example. In an embodiment user computer 2312 and user computer 2314 may be the same device or two or more different devices. Embodiments may vary as to the minimum and total amount of information that may be included for each node of an asset tree. Embodiments may vary as to the type and number of data items, formats, organizations, structures, representations, and the like that are or may be used for an asset tree representation, or any part or portion thereof, in CCC data store 2322, in working storage during the processing of block 2340, or elsewhere and at other times. The processing of block 2340 may be conducted, for example, by CCC console functions 2134 associated with an asset system 2140 as shown in FIG. 10. At the conclusion of the processing of block 2340 of FIG. 12, in an embodiment, information representing a new, changed, or unchanged asset tree definition may be found in CCC data store 2322.

At block 2342 of FIG. 12, definitions for asset metrics may be created or edited. If one or more metric definitions are being created, block 2342 may present the user with an interface for specifying or indicating one or more items, aspects, characteristics, options, selections, or such for the creation of new metrics definitions by the processing of block 2342. In an embodiment, such an interface may include default values or selections for some or all of the information the interface enables a user to indicate or supply. If the definition of one or more metrics is being edited, information of the existing one or more metrics in CCC data store 2322 may be directly or indirectly represented in a display to a user via an interactive interface. The user may provide inputs via the user interface. Such user inputs may be used by the processing of block 2342 to construct a proper representation of one or more new or updated metric definitions, and a representation of the new and/or updated metric definitions may be reflected in the information of CCC data store 2322. User interface displays of the processing of block 2342 may be caused to be displayed on a user interface device such as user computer 2314, for example. Embodiments may vary as to the minimum and total amount of information that may be included for each metric definition. Embodiments may vary as to the type and number of data items, formats, organizations, structures, representations, and the like that are or may be used for the storage of a metric definition, or any part or portion thereof, in CCC data store 2322, in working storage during the processing of block 2342, or elsewhere and at other times. The processing of block 2342 may be conducted, for example, by CCC console functions 2134 associated with an asset system 2140 as shown in FIG. 10. At the conclusion of the processing of block 2342 of FIG. 12, in an embodiment, information representing one or more new, changed, and/or unchanged metric definitions may be found in CCC data store 2322.

In an embodiment, the processing of block 2342 may include processing to create or edit definitions, specifications, indications, or the like, for one or more associations between and among one or more metrics, on the one hand, and one or more assets represented in an asset hierarchy, on the other hand. Embodiments may vary as to the type and number of data items, formats, organizations, structures, representations, and the like, that are or may be used for the representation of such associations in computer storage at any place and time. In an embodiment, defined associations are reflected in the information of CCC data store 2322, and here, as elsewhere, the representation of the defined associations in computer storage may be direct or indirect, expressed or implied, or otherwise.

At block 2344 of FIG. 12, definitions for conditions and/or alerts and/or actions may be created or edited. If one or more conditions and/or alerts and/or actions are being created, block 2344 may present the user with an interface for specifying or indicating one or more items, aspects, characteristics, options, selections, or such for the creation by the processing of block 2344 of new condition and/or alert and/or action definitions. In an embodiment, such an interface may include default values or selections for some or all of the information the interface enables a user to indicate or supply. If the definition of one or more conditions and/or alerts and/or actions is being edited, information of the existing one or more conditions/alerts/actions in CCC data store 2322 may be directly or indirectly represented in display to a user via an interactive interface. The user may provide inputs via the user interface. Such user inputs may be used by the processing of block 2344 to construct a proper representation of the one or more new or updated condition/alert/action definitions, and a representation of the new and/or updated condition/alert/action definitions may be reflected in the information of CCC data store 2322. User interface displays of the processing of block 2344 may be caused to be displayed on a user interface device such as user computer 2314, for example. Embodiments may vary as to the minimum and total amount of information that may be included for each condition/alert/action definition. Embodiments may also vary as to the type and number of data items, formats, organizations, structures, representations, and the like that are or may be used for the storage of a condition/alert/action definition, or any part or portion thereof, in CCC data store 2322, in working storage during the processing of block 2344, or elsewhere and at other times. The processing of block 2344 may be conducted, for example, by CCC console functions 2134 associated with an asset system 2140 as shown in FIG. 10. At the conclusion of the processing of block 2344 of FIG. 12, in an embodiment, information representing one or more new, changed, and/or unchanged condition/alert/action definitions may be found in CCC data store 2322.

In an embodiment, the processing of block 2344 may include processing to create or edit definitions, specifications, indications, or the like, for one or more associations between and among one or more conditions/alerts/actions, on the one hand, and one or more other defined objects, elements, or constructs, on the other hand. Embodiments may vary as to the type and number of data items, formats, organizations, structures, representations, and the like, that are or may be used for the representation of such associations in computer storage at any place and time. In an embodiment, defined associations are reflected in the information of CCC data store 2322, and here as elsewhere, the representation of the defined associations in computer storage may be direct or indirect, expressed or implied, and otherwise.

At block 2346 of FIG. 12, command, control, and configuration (CCC) information for the monitoring and/or reporting processing of the AMRS as may appear in CCC data store 2322, may be created or edited. If the information is being created, block 2346 may present the user with an interface for specifying or indicating one or more items, aspects, characteristics, options, selections, or such for the creation of new CCC information by the processing of block 2346. In an embodiment, such an interface may include default values or selections for some or all of the information the interface enables a user to indicate or supply. If CCC information is being edited, existing information of CCC data store 2322 may be directly or indirectly represented in a display to a user via an interactive interface. The user may provide inputs via the user interface. Such user inputs may be used by the processing of block 2346 to construct a proper representation of the information and to reflect it in CCC data store 2322. User interface displays of the processing of block 2346 may be caused to be displayed on a user interface device such as user computer 2314, for example. Embodiments may vary as to the minimum and total amount of user-configurable information, and the purposes of which, that may be included in CCC data that determines, conditions, or otherwise influences the operation of monitoring and/or reporting aspects of the processing of an AMRS. Embodiments may vary as to the type and number of data items, formats, organizations, structures, representations, and the like that are or may be used for the storage of monitoring and/or reporting CCC information, or any part or portion thereof, in CCC data store 2322, in working storage dream the processing of block 2346, or elsewhere and at other times. The processing of block 2346 may be conducted, for example, by CCC console functions 2134 associated with an asset system 2140 as shown in FIG. 10. At the conclusion of the processing of block 2346 of FIG. 12, in an embodiment, information representing new, changed, and/or unchanged CCC information that determines, conditions, or otherwise influences the operation of monitoring and/or reporting aspects of the processing of an AMRS may be found in CCC data store 2322.

It is noted that as the illustrative example 2300 of FIG. 12 envisions an AMRS combining DIQ and asset system functionality as described in relation to FIG. 10, CCC data store 2322 of FIG. 12 finds a counterpart in a shared CCC data store 2132 as described in relation to FIG. 10, and, similarly, any discussion here in reference to CCC console processor 2134 of FIG. 10 embraces an embodiment of a shared CCC console as discussed there.

At block 2350 of FIG. 12, ongoing automatic and/or on-demand monitoring and/or reporting for an asset hierarchy as may be provided by an AMRS is conducted. The processing of block 2350 may utilize information reflected in CCC data store 2322 as described for the processing of other blocks of 2300, to determine, direct, condition, or otherwise influence its operational activity. In an embodiment, asset hierarchy monitoring activity may include data intake, internal data generation, computer-to-computer data transmission/presentation, and computer-to-person data presentation, for example, with a possible emphasis on data intake and generation aspects. In an embodiment, asset hierarchy reporting activity may include one or more of the same with a possible emphasis on data presentation aspects. The processing of block 2350 may be conducted, for example, by a combination of DIQ 2120 and asset system 2140 of FIG. 10, in an embodiment.

Examples for the processing of block 2350 for illustrative implementations, applications, or instantiations of an AMRS, follow. In one example, the processing of block 2350 may include monitoring sensors on a connected soldier in the battlefield and generate appropriate alerts for received impacts or heartbeat abnormalities. In one example, the processing of block 2350 may include monitoring process control equipment in a beverage processing facility and generate alerts for out-of-range temperatures or vibration anomalies. In one example, the processing of block 2350 may include monitoring activity in a workorder management system report impacts caused by scheduled downtime. In one example, the processing of block 2350 may include monitoring changes in process control settings, such as PID control settings, and report impacts on the accuracy of control loops. These are but a few illustrative examples.

An appreciation for the methods 2300 of FIG. 12 may be further developed by consideration of methods and user interface examples illustrated and discussed in relation to figures that follow.

3.2 Asset Hierarchy Establishment

Figure 14:
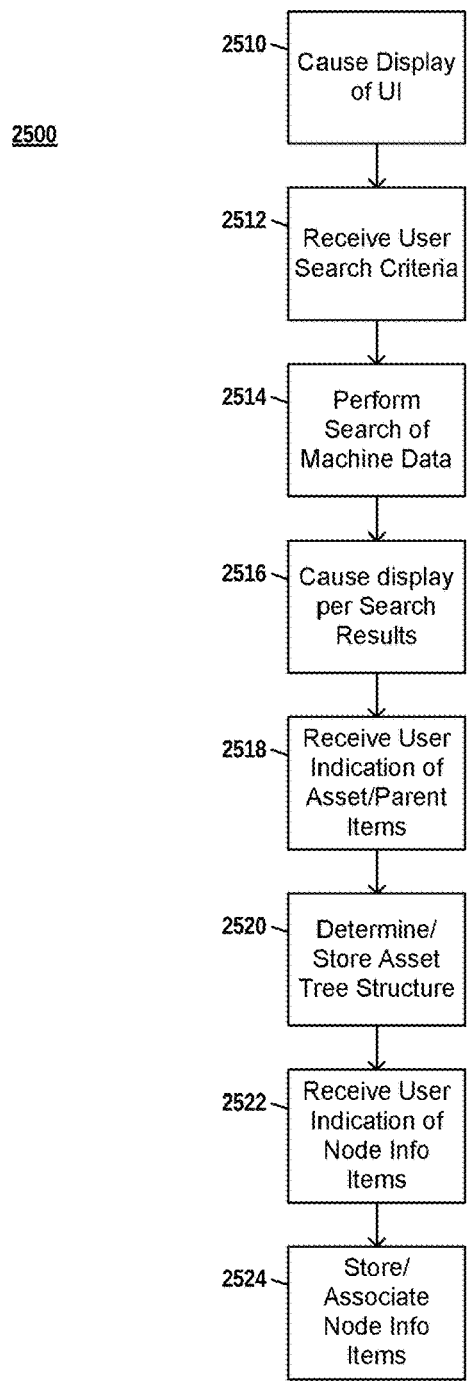
FIG. 14 illustrates a method for constructing an asset tree representation in control storage.

FIG. 14 illustrates a method for constructing an asset tree representation in control storage. Method 2500 of FIG. 14 illustrates a method as might be employed in an embodiment during the processing of block 2340 of FIG. 12, for example. Processing of block 2510 of FIG. 14 causes the display of a user interface on a user interface device. The user interface may be interactive enabling a user to both receive information from the AMRS (e.g., its CCC console processor) and to provide information to the AMRS as enabled by the user interface. At block 2512, the AMRS receives an indication of search criteria which may be provided by user interaction with the user interface. In an embodiment, the search criteria indications may represent some or all of the search criteria used in a DIQ search query to identify useful asset-related information. In an embodiment, the search criteria indications may be provided by user interaction in one or more forms, for example, selections of checkboxes associated with a particular search criteria, segments of text in the form of a query language that specify search criteria, the text of a fully formed search query in accordance with the query language, or others. At block 2514, the indications of search criteria received at block 2512 are utilized by the AMRS to construct, as necessary, a search query to locate useful asset-related information, and to execute a search to locate such useful asset-related information in accordance with the indicated search criteria. In an embodiment, the AMRS may conduct such a definition-time search by passing a search query request to a DIQ component of the system. At block 2516, some or all of the search results from the processing of block 2514 are caused to be displayed via a user interface. In an embodiment, processing of block 2516 enables a user to view the search results and to iterate back to block 2512 if the search results are deemed unsatisfactory. Processing of block 2516 may enable a user to indicate satisfaction with the search results and thereby advance to processing that enables a user to make certain classifications of the search results, perhaps by updating the display of the user interface. In one embodiment, the user interface initially displayed from the processing of block 2516 may enable the user to immediately indicate the certain classifications, and any particular user interactions to indicate the classifications may be interpreted by block 2516 as an indication by the user of satisfaction with the search results. Other embodiments are possible. At block 2518, indications of user classifications of the search results are received and processed. The processing of block 2518, in an embodiment, may receive and process an indication of data in the search result set that may be used to provide an identification of assets to be represented as nodes in an asset hierarchy. The processing of block 2518 in an embodiment may receive and process an indication of data in the search result set that may be used to provide an identification of a parent asset corresponding to an asset identified in the search result set. In an embodiment, the user indications received and processed at block 2518 may be indications of the identification of fields produced by the search query that provide asset identifying and parent asset identifying information. At block 2520, the AMRS makes a determination of an asset tree structure by processing the result of the search query produced at block 2514, or a related search, in view and consideration of the asset and parent indications received at block 2518. A related search, in an embodiment, may be a search that is derived from the original search but is somehow modified, perhaps by restricting the fields returned in the search result set, or perhaps by expanding the scope of the data searched, or perhaps by other variations. The processing of block 2520, in an embodiment, may determine all of the unique identifiers that may be found within the designated asset identifier field of the search result set and create an asset hierarchy node for each, determine a respective parent for each unique asset using information found within the designated asset parent identifier field of the search result set, and cross reference asset identifiers and asset parent identifiers to determine the hierarchical relationships for the asset nodes and create a representation of those associations between the created asset nodes. Such representations may be express or implied, direct or indirect, or otherwise. In one embodiment, such representation is made by including the asset id for the parent asset among the information of each non-root node. In one embodiment, such representation is made by including the asset id for the child among one or more entries of a child-list maintained for each asset node. Other embodiments are possible. The processing of block 2520, in an embodiment, may conclude with a representation of the determined asset hierarchy recorded in computer storage, perhaps in computer storage of the local working context, or perhaps in persistent computer storage of a CCC data store. These and other embodiments are possible.

At block 2522, in an embodiment, processing is performed to receive and process user indications of data items, elements, fields, constants, or the like that should be included in, directly or indirectly, the definitional information of nodes in the asset hierarchy tree. In one embodiment, indications received and processed at block 2522 are indications of fields in the search result set produced at block 2514 or produced elsewhere that contain information that should be included among the definitional information of the asset hierarchy. The indications received and processed at block 2522 are utilized in the processing of block 2524 to augment the asset identifier information of the asset hierarchy with additional, possibly per-node, information. The processing of block 2524, in an embodiment, may conclude with a representation in the computer storage that reflects an asset hierarchy structure with augmented information. These and other embodiments are possible.

Figure 15:
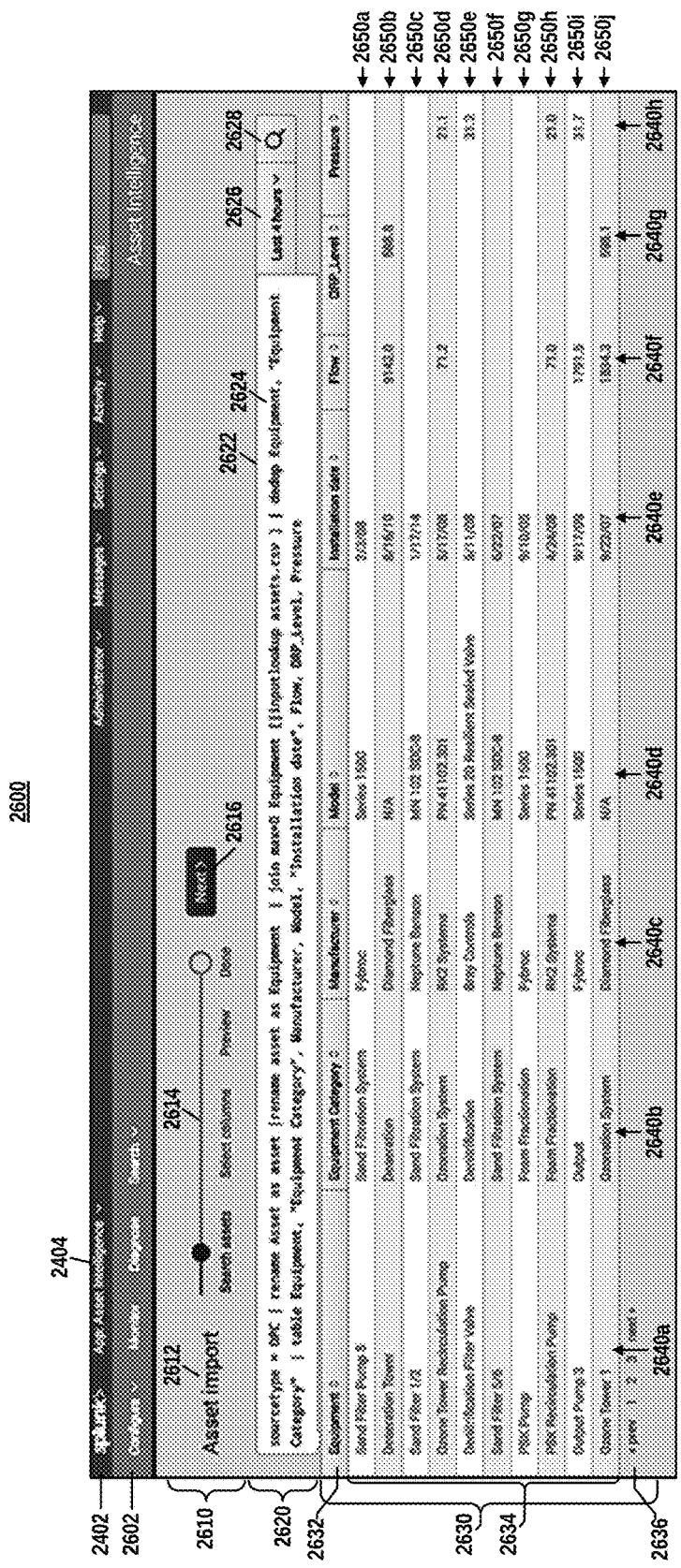
FIG. 15 illustrates a user interface display for an asset search console function.

FIG. 15 illustrates a user interface display for an asset search console function. User interface display 2600 is such as might be caused to display during the processing of block 2340 of FIG. 12, or the processing of method 2500 of FIG. 14, for example; such processing possibly performed by a command, control, and configuration console processor such as 2134 of FIG. 10. User interface display 2600 of FIG. 15 is shown to include system header bar 2402, application information and menu bar 2602, console function header area 2610, search specification area 2620, and search result area 2630. Application information and menu bar 2602 is shown to include a title for the application or topic within the system to which the user interface pertains ("Asset Intelligence"), and a number of menu and/or navigation options ("Configure", "Monitor", "Diagnose", "Search") which may be interactive elements for navigation, drop-down menus, drop-down selection lists or such. Console function header area 2610, which may identify an AMRS CCC console function to which the current user interface pertains, is shown to include function identifier or title 2612 ("Asset import"), function/task progress indicator 2614, and "Next" action button 2616. Function/task progress indicator 2614 may provide a user with information about the association of the current user interface 2600 with a particular step, segment, or subtask of a multipart task, process, or workflow, such as "Asset import." As shown, progress indicator 2614 indicates by a solid colored circle that interface 2600 is associated with a "Search assets" portion of an "Asset import" function, task, or workflow. In an embodiment, action button 2616 may be interactive enabling the user by a keypress, mouseclick, touchscreen press, or the like, to indicate to the AMRS a desire to navigate to processing and an associated user interface for a subsequent portion of the "Asset import" function.

Search specification area 2620 is shown in FIG. 15 to include a search specification text box 2622 displaying the text of a search language query 2624, a search timeframe specification component 2626, and an execute-search action button 2628. In an embodiment, the displayed text of the search language query 2624 (or other form of search criteria specification) may be a system supplied initial value, a user entered value, a user edited version of a system supplied value, a recalled value from a user profile, a last-used value, or a value from another source. Other implementations are possible. Search timeframe specification component 2626 may be an interactive element such as a drop-down selection box that displays some defaulted value or the last value specified or selected by the user, shown here as "Last 4 hours." Execute-search action button 2628 may be an interactive element such as an iconized action button that may enable the user by a supported interaction to indicate to the AMRS a desire to execute the search specified by information that may include values associated with user interface elements 2622 and 2626. An AMRS in an embodiment may respond to user interaction with action button 2628 by receiving user input and performing processing to execute a search specified at least in part by content represented in search specification area 2620 of interface 2600. In an embodiment, performing a specified search for asset-related data may include invoking services or functions of a data intake and query system (DIQ) to perform the specified search and produce a search result. An embodiment may utilize the search result set to populate the search result display area 2630. While inventive aspects may not be so limited, search result display area 2630 of example interface 2600 is shown to present search results in a tabular format, shown here as an orthogonal grid of information cells each uniquely identifiable by the combination of the row in which it appears and the column in which it appears. Search result display area 2630 is shown to include column headings area 2632, table data area 2634, and table data navigation control area 2636. Each of the rows 2650a-j appearing in table data area 2634 has an information display cell located in each of columns 2640a-h, indicated by the headings of 2632 to be information cells for "Equipment", "Equipment Category", "Manufacturer", "Model", "Installation date", "Flow", "ORP_Level", and "Pressure", respectively. In an embodiment, the column headings of 2632 may be populated with the names of fields returned in the search result set. In an embodiment, each of the rows appearing in the table data area may correspond to an individual instance, record, entry, or such, of a search result. In an embodiment, individual column headings of 2632 may be interactive so as to enable the user to indicate to the AMRS a desire to see the information appearing in table data area 2634 sorted according to the order of the values appearing in the column corresponding to the heading with which the user interacted. These and other embodiments and variations are possible.

It may be worth noting that one of skill may well consider the present teachings, illustrated here in terms of a tabular information format with rows and columns, in different terms that may more artfully pertain in a particular implementation without necessarily departing from inventive aspects. For example, a table of data may be considered in terms of a file, dataset, array, list, collection, or others, and perhaps in particular reference to having one or more rows or row equivalents, and one or more columns or column equivalents. For example, a row may be considered in terms of the tuple, record, entry, line, dimension, or others. For example, a column may be considered in terms of a field, item, position, offset, dimension item, category, or others. For example, a column title or heading may be considered in terms of a field name, item name, or key. For example, a table cell may be considered in terms of a field value, item value, dimension item value, or value as may pertain to a key-value pair, or others. The illustration of inventive embodiments using a tabular data format with columns and rows should not be considered as limiting the practice of inventive aspects where that is not otherwise required.

A user may indicate to the AMRS that the search specified at 2620 is adequate to capture data that embraces an asset hierarchy for which the user desires monitoring and/or reporting operations to be performed by the AMRS. In the example illustrated by interface 2600, a user may interact with action button 2616 to make such an indication of the adequacy of the specified search. In an embodiment, consequent to receiving an indication of user interaction with action button 2616 of interface 2600, an AMRS may perform processing that directly or indirectly may cause the display of a user interface such as depicted in FIG. 16.

Figure 16:
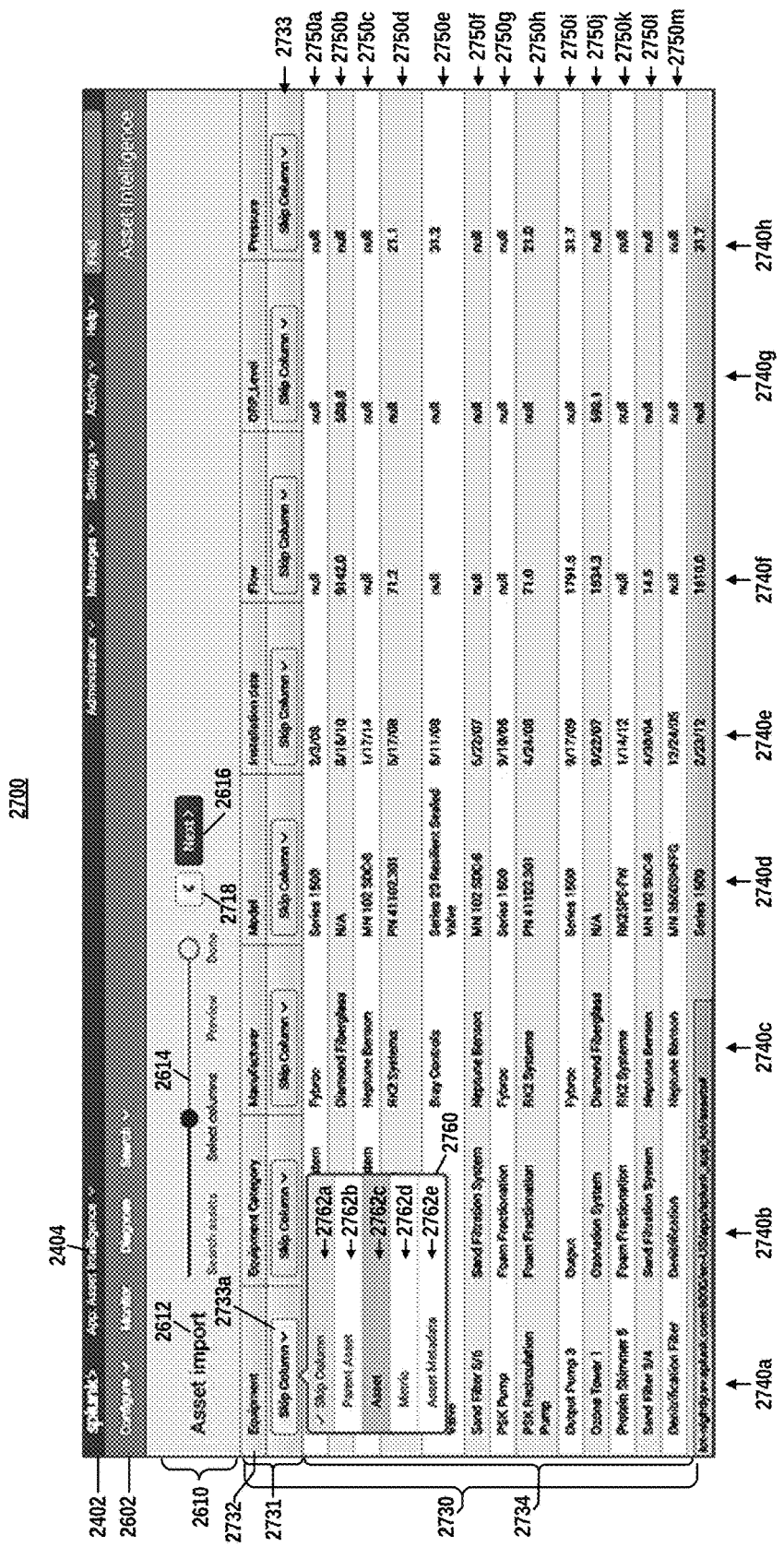
FIG. 16 illustrates a user interface display for an asset information classification console function.

FIG. 16 illustrates a user interface display for an asset information classification console function. User interface display 2700 is such as might be caused to display during the processing of block 2340 of FIG. 12, or the processing of method 2500 of FIG. 14, for example; such processing possibly performed by a command, control, and configuration console processor such as 2134 of FIG. 10. User interface display 2700 of FIG. 16 is shown to include system header bar 2402, application information and menu bar 2602, console function header area 2610, and search result area 2730. System header bar 2402 and application information and menu bar 2602 are as described for identically numbered elements appearing in, and described in relation to, depictions of user interface displays in earlier figures. Console function header area 2610 is as described for the identically numbered element depicted in interface display 2600 of FIG. 15 with the exceptions that the current position indicator associated with function/task progress indicator 2614 is shown here advanced to the "Select columns" task portion, and that a "Previous" action button 2718 counterpart to "Next" action button 2616 now appears.

Search result display area 2730 of FIG. 16 largely corresponds to search result display area 2630 of FIG. 15. The column or field names appearing in column headings area 2632 of FIG. 15 also appear in the same relative positions in column names area 2732 of FIG. 16, albeit without the companion sort action interface elements. Table data area 2734 of FIG. 16 finds correspondence to table data area 2634 of FIG. 15 with a difference that table data area 2734 of FIG. 16 is shown to include a greater number of individual rows (2750 a-m). Columns 2740a-h of search result display area 2730 of FIG. 16 directly correspond to columns 2640a-h of FIG. 15. Notably, the column header area 2731 of FIG. 16 is expanded beyond merely including a column or field name header row 2732 (or 2632 of FIG. 15) to also including a column classification row 2733. Column classification row 2733 includes a classification interface component in each of the columns of the row, such as classification selection drop-down 2733a appearing in row 2733 at column position 2740a. User interaction with classification selection drop-down 2733a may cause the display of a drop-down selection list such as 2760. The drop-down selection list may provide a user with a number of interactive selection options, each option designating a role that column data may play in constructing a representation of an asset hierarchy. Drop-down selection list 2760 of the illustrated embodiment is shown to include a defaulted "Skip Column" option 2762a, the default to, or express selection of which, indicates that data of the column may be ignored for purposes of defining an asset hierarchy.

Drop-down selection list 2760 of the illustrated embodiment is shown to include a "Parent Asset" option 2762*b*, the selection of which indicates that data of the column includes an asset identifier for an asset that is the parent of the asset represented by the particular row in the table. When creating a representation of an asset hierarchy from the search result data, the AMRS may utilize information in a "Parent Asset" column when determining the internodal associations or relationships that define the hierarchical structure. In one embodiment, no more than one column may be classified as a "Parent Asset" column.

Drop-down selection list 2760 of the illustrated embodiment is shown to include an "Asset" option 2762*c*, the selection of which indicates that data of the column includes the asset identifier for the asset represented by the particular row in the table. When creating a representation of an asset hierarchy from the search result data, the AMRS may utilize information in an "Asset" column when determining or associating an identification for nodes in the hierarchy. In one embodiment, no more than one column may be classified as an "Asset" column. In one embodiment, a first column designated as an "Asset" column is used to determine or associate an identification for a node, and any subsequent column designated as an "Asset" column is included in the asset tree definitional data as nickname metadata for the node.

Drop-down selection list 2760 of the illustrated embodiment is shown to include a "Metric" option 2762*d*, the selection of which indicates that data of the column is related to a metric for the asset represented by the particular row in the table. When creating a representation of an asset hierarchy from the search result data, the AMRS may utilize information in a "Metric" column, particularly the column name or heading in one embodiment, to include the metric among one or more metrics that may be associated with the asset represented by the particular row in the table. Such an association will not occur in an embodiment where the metric column value in the asset row is, for example, a null value.

Drop-down selection list 2760 of the illustrated embodiment is shown to include an "Asset Metadata" option 2762*e*, the selection of which indicates that data of the column includes information that describes or is otherwise related to the asset represented by the particular row in the table. When creating a representation of an asset hierarchy from the search result data, the AMRS may utilize information in an "Asset Metadata" column to populate a metadata portion, and possibly a user-defined metadata portion, of definitional data associated with a node of the asset hierarchy.

Classification interface components appearing in each of the columns of row 2733 operate likewise in an embodiment for their respective columns. In one embodiment, "Next" action button 2616 may be disabled for user interaction unless a column has been classified as an "Asset" column and a column has been classified as a "Parent Asset" column. When system requirements are satisfied, "Next" action button 2616 may be enabled. When user desires are satisfied, a user may interact with "Next" action button 2616 to indicate satisfaction. In one embodiment, and AMRS receiving an indication of user interaction with "Next" action button 2616 may conclude processing as described in relation to block 2518 of FIG. 14, and proceed to processing described in relation to block 2520 of FIG. 14 where the AMRS determines an asset tree hierarchy using search results and user classifications, in one embodiment.

In an embodiment employing user interface 2700 of FIG. 16, the AMRS may perform processing as described in relation to blocks 2522 and 2524 of FIG. 14 in conjunction with the processing as described for blocks 2518 and 2520. In one embodiment, for example, a user input indicating a classification of the column as a "Metric" or "Asset Metadata" column may implicate the processing of block 2522 of FIG. 14. Other implementations and embodiments are possible. In one embodiment, after determining an asset hierarchy from search result data the AMRS may cause the display of the user interface as illustrated in FIG. 17.

Figure 17:
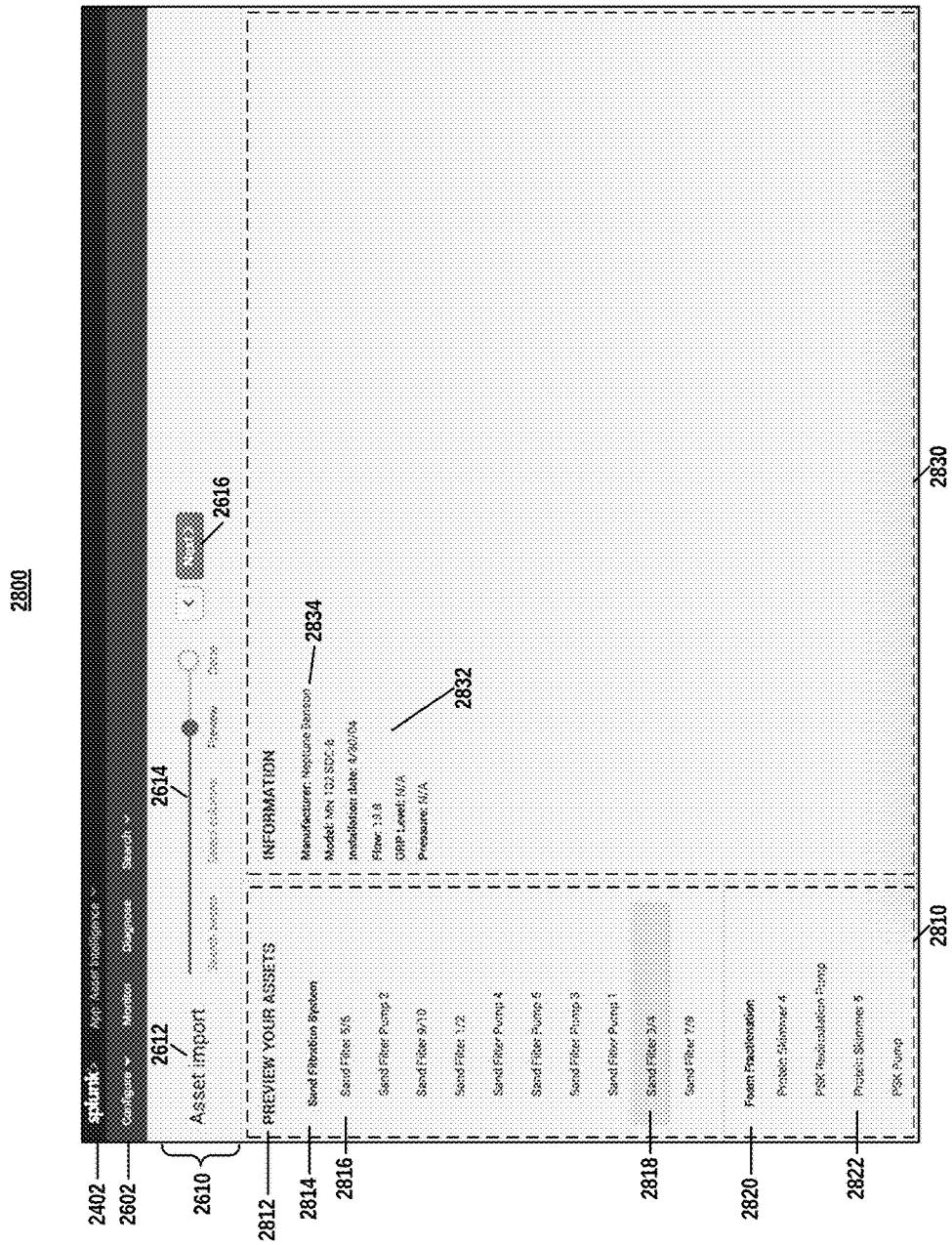
FIG. 17 illustrates a user interface for an asset tree display console function.

FIG. 17 illustrates a user interface for an asset tree display console function. User interface display 2800 as such as might be caused to display during the processing of block 2340 of FIG. 12, or the processing of method 2500 of FIG. 14, for example; such processing possibly performed by a command, control, and configuration console processor such as 2134 of FIG. 10. User interface display 2800 of FIG. 17 is shown to include system header bar 2402, application information and menu bar 2602, console function header area 2610, asset tree display area 2810, and asset tree node information area 2830. System header bar 2402 and application information and menu bar 2602 are as described for identically numbered elements appearing in, and described in relation to, depictions of user interface displays in earlier figures. Console function header area 2610 is as described for the identically numbered element depicted in interface display 2600 of FIG. 16 with the exception that the current position indicator associated with function/task progress indicator 2614 is shown here advanced to the "Preview" task portion. Asset tree display area 2810 is shown to include area title 2812, "PREVIEW YOUR ASSETS". In one embodiment, asset tree display area title 2812 displays the name, title, or other identifier for the root node of an asset hierarchy. In one embodiment, asset tree display area title 2812 remains fixed in its position regardless of whether the content displayed beneath is scrolled from its initial or default position. Content displayed in the asset tree display area 2810 beneath area title 2812 is a hierarchical listing of the names, titles, or other identifiers of the nodes in the asset hierarchy beneath the root node. The hierarchical level of a node determines the amount of indentation displayed for its identifier. For example, node entry 2814 for a node named "Sand Filtration System" is a child of the root node, at level 1 in the asset hierarchy, and so displayed with a first amount of indentation. As a second example, node entry 2816 for a node named "Sand Filter 5/6" is a child of the "Sand Filtration System" node, a grandchild of the root node, at level 2 in the asset hierarchy, and so displayed with a second amount of indentation which, in one embodiment, is a greater amount of indentation than for any level above it in the hierarchy. That is to say, the deeper a node is in the asset hierarchy (the higher its level number) the greater the amount of indentation used for its name as displayed in asset tree display area 2810. As yet a further example, node entry 2820 for a node named "Foam Fractionation" is a child of the root node, at level 1 in the asset hierarchy, and so displayed with the same first amount of indentation as for node entry 2814. As one final example, node entry 2822 for a node named "Protein Skimmer 5" is a child of the "Foam Fractionation" node, a grandchild of the root node, at level 2 in the asset hierarchy, and so displayed with the same second amount of indentation as for node entry 2816.

Node entry 2818 for a node named "Sand Filter 3/4" is shown having a darker background than the other node entries displayed in asset tree display area 2810. The distinctive highlighting of node entry 2818 is a visual indicator that the user has interacted with the interface to indicate a selection of node entry 2818. In an embodiment, a mouse click or touchscreen press in the display area of node entry 2818 may be an indication to the computing machine of the user's desire to select the particular entry. A selected node entry of asset tree display area 2810, such as node entry 2818, may cause interface 2800 to be refreshed or updated to display information associated with the node represented by the selected node entry in asset tree node information area 2830. In this example, asset tree node information area 2830 is shown to include the area title of "INFORMATION" followed by a list of information items 2832 related to the node which, in an embodiment, may be stored in or in association with the representation of the node in a stored form of the asset tree hierarchy, perhaps as it was just determined. In one embodiment, the list of information items 2832 may include an entry for each column classified as a Metric or Asset Metadata column during the processing associated with interface 2700 of FIG. 16. Each entry in the list of information items 2832 may be displayed as a column or field name followed by the corresponding value. For example information items list entry 2834 is shown with column or field name "Manufacturer:" and the value "Neptune Benson." In one embodiment, while having an entry in the list of information items 2832, information items showing a value of "N/A" (indicative of a null value in an earlier search result) are not actually recorded as part of the definitional information in a final stored form of the asset tree hierarchy. Such a final stored form of the asset tree hierarchy may be created and committed to computer storage such as the CCC data store 2132 of FIG. 10, in response to the AMRS receiving an indication of user interaction with "Next" action button 2616 of interface 2800 of FIG. 17. Such processing may be part of the concluding processing contemplated for block 2340 of FIG. 12, in an embodiment.

Figure 18:
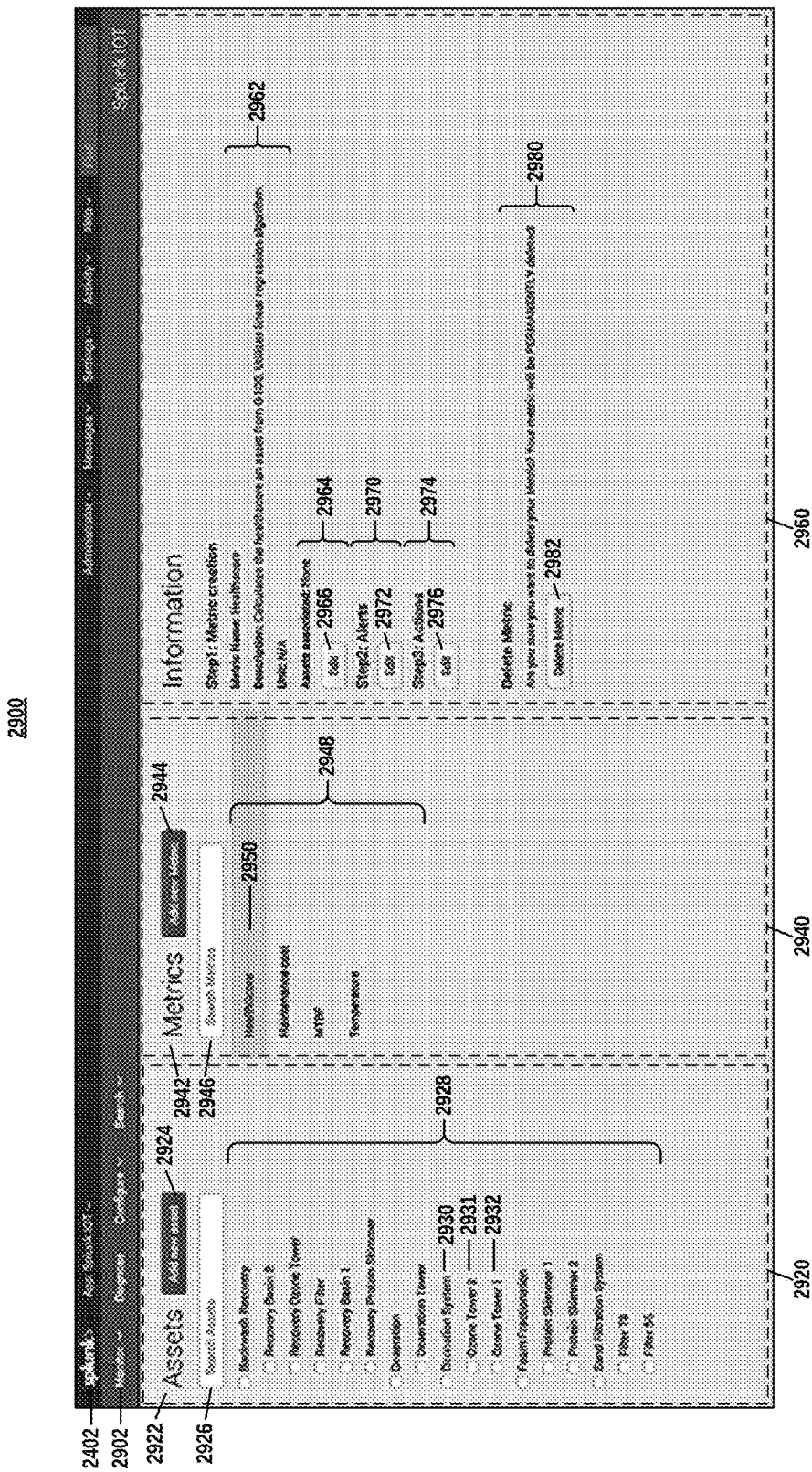
FIG. 18 illustrates a user interface display for a metrics console function.

FIG. 18 illustrates a user interface display for a metrics console function. User interface display 2900 is such as might be caused to display during the processing of block 2342 of FIG. 12, for example; such processing possibly performed by a command, control, and configuration console processor, such as 2134 of FIG. 10. User interface display 2900 of FIG. 18 is shown to include system header bar 2402, application information and menu bar 2902, asset hierarchy display area 2920, metrics overview display area 2940, and metric detail display area 2960. System header bar 2402 is as described for identically numbered elements appearing in, and described in relation to, depictions of user interface displays in earlier figures. Application information and menu bar 2902 is comparable to other application information and menu bars depicted and described in relation to earlier appearing figures, such as bar 2602 of FIG. 17. Asset hierarchy display area 2920 may enable a user to identify one or more assets of an asset tree for which metrics information may be created, edited, deleted, or otherwise processed. Metrics overview display area 2940 may enable a user to view a range of defined metrics associated with an asset hierarchy and to select a particular metric for individual processing, such as editing, or deletion. Metric detail display area 2960 may enable a user to view and interact with information and processing for a particular metric.

Asset hierarchy display area 2920 is shown to include area title 2922 "Assets", "Add new asset" action button 2924, asset search component 2926, and asset node list 2928. Asset node list 2928 includes a node list entry for each of one or more of the nodes in an asset hierarchy. In one embodiment, initially and by default, node list 2928 includes a node list entry for every node in the asset hierarchy except for the root node. In an embodiment, a user may interact with asset search component 2926 of interface 2900 to indicate to the AMRS filter criteria as may be applied to the nodes of the asset hierarchy before populating list 2928. For example, a user may enter the word "recovery" into a text box of search component 2926 and the AMRS upon receiving that indication may update asset tree node list 2928 to include entries for only those nodes of the asset tree whose names include the word "recovery." In such an example, the displayed asset tree node list 2928 would be shortened to show only the "Backwash Recovery" node entry and the node entries for its children, i.e., "Recovery Basin 2" through "Recovery Proteins Skimmer." The display of asset tree node list 2928 may depict the hierarchical relationship among the nodes using an indentation scheme such as that described in regard to the node list display of 2810 of FIG. 17. Examples of asset node entries of list 2928 shown for interface 2900 include node entry 2930 representing level 1 node "Ozonation System", node entry 2931 representing level 2 node "Ozone Tower 2", and node entry 2932 representing level 2 node "Ozone Tower 1". Asset tree node list 2928 of FIG. 18 may include an interactive check box for one or more node entries to enable a user to identify a selection of one or more asset nodes through interaction with the checkboxes. For example, a user may interact with a number of checkboxes to place them in a selected state, and the set of asset node entries with selected checkboxes may be used to associate the asset tree nodes represented by those entries with a metric being created or edited. In an embodiment, the selection state of checkboxes in the node entries of list 2928 may be set by the AMRS to correspond to the set of assets associated with a metric selected from metrics list 2948.

A user interaction with "Add new asset" action button 2924 that is indicated to the AMRS may cause the AMRS to engage processing to effect the addition of one or more nodes to the current asset tree hierarchy. In one embodiment, the AMRS may present a user interface similar to interface 2700 of FIG. 16 but including one or more empty table rows that are enabled for data entry by the user such that the user can manually supplement the data of the search result set. Such manual supplementation to the search result set may be useful, for example, in the situation where a user is aware of new assets that are about to come online but for which no machine data has yet been collected. In one embodiment, in response to an indication of user interaction with "Add new asset" action button 2924 of FIG. 18, AMRS may engage processing to effect the addition of one or more nodes to the current asset tree hierarchy by presenting a user interface, such as a modal window, that enables a user to specify information sufficient to define an additional node in the asset tree hierarchy. These and other embodiments are possible.

Metrics overview display area 2940 is shown to include area title 2942 "Metrics", "Add new Metric" action button 2944, metrics search component 2946, and metrics list 2948. In an embodiment metrics list 2948 may be populated by the AMRS with an entry for each already-defined metric known to the AMRS. In an embodiment, metrics list 2948 may be populated by the AMRS with an entry for each already-defined metric known to the AMRS and associated with at least one node of the asset tree hierarchy represented in whole or in part in 2920. In an embodiment, metrics list 2948 may be populated by the AMRS with an entry for one or more metrics known to the AMRS to be associated with any manufacturer (or other metadata information item) that is associated with any asset node of the asset tree hierarchy represented in whole or in part in 2920. These and other embodiments are possible. In an embodiment, population of metrics list 2948 by the AMRS may be influenced by prior user interaction with metrics search component 2946 to supply a filter criteria.

Individual entries of metrics list 2948 may each be enabled for user interaction so as to enable a user to indicate a selection of one of the entries of the list, in an embodiment. Metrics list entry 2950 of interface 2900, "HealthScore", is depicted with a different background color than that of the other entries, indicating a default selection of the metric associated with that entry or indicating a prior user interaction with that entry to effect such a selection. The selection of an entry of metrics list 2948 may result in the display of information and user interface elements in a metric information area 2960 that are pertinent to the metric represented by the selected entry, such as selected entry 2950. User interaction with "Add new Metric" action button 2944 may be indicated to the AMRS, which may in response present a modified or alternate user interface display enabling a user to indicate sufficient information to define a new metric.

Metric detail display area 2960 displays information and user interface elements pertinent to the metric represented by the selected entry of metrics list 2948, such as selected entry 2950, "HealthScore". Metric detail display area 2960 is shown to include general information area 2962, metric configuration action area 2964, alerts configuration action area 2970, actions configuration action area 2974, and metric deletion action area 2980. General information area 2962 may display one or more information items of the defined metric using a fieldname:value format (e.g. "Metric Name: Healthscore"), and may display one field or information item on each line. Metric configuration action area 2964 is shown to indicate a count of the number of assets (asset nodes) associated with the subject metric, which count may correspond to the number of node entries of list 2928 having selected checkboxes, in an embodiment. Metric configuration action area 2964 is shown to include Edit action button 2966 enabling a user to indicate a desire to view and change information of a metric configuration. Alerts configuration action area 2970 is shown to include an area title or caption, and Edit action button 2972. Actions configuration action area 2974 is shown to include an area title or caption, and Edit action button 2976. In response to an indication of user interaction with any of Edit action buttons 2966, 2972 and 2976, the AMRS may cause the display of an updated, altered or alternate user interface that displays appropriate information and enables a user to indicate changes thereto. Examples of such are illustrated and discussed in relation to figures that follow.

Metric deletion action area 2980 is shown to include an area title or caption, a deletion warning message, and "Delete Metric" action button 2982. In response to an indication of user interaction with action button 2982, the AMRS may display a user interface element, such as a message box, requiring a final user confirmation for a deletion action and, upon receipt of an indication of such a confirmation, the AMRS may engage processing to erase, suspend, deactivate, flag, mark, or otherwise logically or physically "delete" the metric definition. Such processing may further include updating metrics list 2948 to remove the entry representing the deleted metric, in an embodiment.

Figure 19:
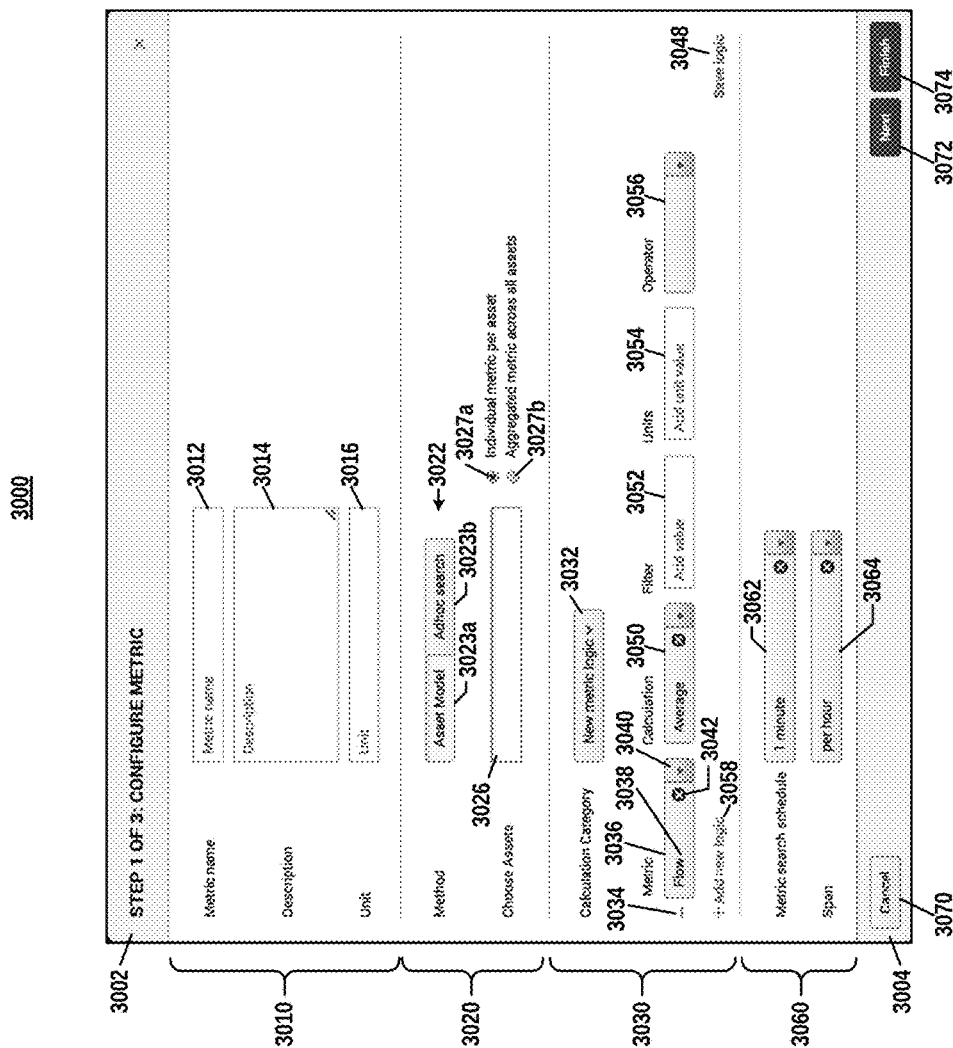
FIG. 19 illustrates a user interface display for a metrics configuration console function.

FIG. 19 illustrates a user interface display for a metrics configuration console function. In an embodiment of an AMRS, interface 3000 of FIG. 19 may be caused to be displayed on a user interface device in response to user interaction with "Add new Metric" action button 2944 or Edit action button 2966 of FIG. 18. When interface 3000 of FIG. 19 is displayed in response to user interaction with "Add new Metric" action button 2944 of FIG. 18, information components of the user interface may be empty, contain default values, and/or display tips to the user regarding the use of the component. When interface 3000 of FIG. 19 is displayed in response to user interaction with Edit action button 2966 of FIG. 18, information components of the user interface may be populated with information values from the existing metric definition. Interface 3000 of FIG. 19 is shown to include header area 3002, footer area 3004, general information area 3010, data selection area 3020, metric determination area 3030, and metric time factor area 3060. Header area 3002 of interface 3000 is shown to include a title or caption for the interface.

General information for the metric definition is displayed and/or indicated by the user via the interface components of general information area 3010. General information area 3010 is shown to include a metric name component 3012, a metric description component 3014, and a metric units components 3016. In this illustrative example, the metric name component 3012 is an interactive text box used by the AMRS to display information it has for the name or identifier of the metric and to receive indications of a user-desired value for the name or identifier of the metric. Similarly, the metric description component 3014 is an interactive text box used by the AMRS to display information it has regarding a description for the metric and to receive indications of a user-desired value for the description. Similarly, the metric units component 3016 is an interactive text box used by the AMRS to display information it has for a designated unit to be associated with values identified or produced for the metric and to receive indications of a user-desired value for the metrics unit. For example, a metric unit may be a unit of measurement such as degrees-Fahrenheit or pounds-per-square-inch (PSI).

In one embodiment, metrics may be determined by search queries executed against asset-related data (that may include other metric data). In one embodiment, the asset-related data are kept by and/or accessed via a data intake and query (DIQ) system such as DIQ 108 of FIG. 1 or DIQ 2120 of FIG. 10. In one embodiment, more particularly, asset-related metrics are determined by search queries processed by a DIQ against data it stores, indexes, manages, and/or provides access to for search processing. Accordingly, in such an embodiment, metric configuration or definition data may relate directly to the specification of search queries to be executed using the processing facilities of a DIQ. Such search queries may be executed by a DIQ just as the definition-time search discussed earlier in relation to block 2514 of FIG. 14, but are, in contrast, metric- or metric-time search queries for deriving metric data/measurements. In that vein, data selection area 3020 of FIG. 19 is used to display or specify information of a metric definition related to data selection aspects of a search query for the metric. Data selection area 3020 of interface 3000 is shown to include a set of option buttons 3022 including an "Asset Model" option button 3023a and an "Ad hoc search" option button 3023b. Data selection 3020 is shown to further include chosen-asset component 3026 and aggregation mode selection radio buttons 3027a-b. In an embodiment, when "Asset Model" option button 3023a is activated (to the exclusion of option button 3023b) a user is enabled to indicate to the AMRS a selection of one or more assets represented by nodes in the asset hierarchy, and the AMRS processes the indicated selection to determine a search query, aspects, or portions that cause the executed search query to match, select, filter, or identify the data properly associated with the asset selection and as may be relevant to the production of the metric value.

In one embodiment, a user is enabled to indicate a selection of assets by entering their identifiers into chosen-asset component 3026. In one embodiment, a user is enabled to indicate a selection of assets by selecting one or more assets from a displayed list of nodes in the asset hierarchy. In such an embodiment, the AMRS when processing the user indications may populate chosen-asset component 3026 with the names of the assets that were indicated for selection by the user.

Aggregation mode selection radio buttons 3027a-b may not strictly be related to a data selection aspect of a DIQ search query but may be related to an aspect of a DIQ search query that determines how the selected data is processed to produce a search query result. In one embodiment, indicating individual (non-aggregated) metric mode to the AMRS using radio button 3027a may result in the AMRS determining a search query, aspect, or portion that causes the executed search query to produce a value for the metric on a per-asset basis, instead of or in addition to producing the value for the metric on an aggregated basis. In one embodiment, indicating aggregated metric mode to the AMRS using radio button 3027b may result in the AMRS determining a search query, aspect, or portion that causes the executed search query to produce a value for the metric on an aggregated basis. In an embodiment, a search query that does not indicate a need for per-asset results (or that indicates only an aggregated result is required) may permit the DIQ to execute the search query in an optimized fashion with early data aggregation, reducing resource consumption and speeding the execution of the query. Accordingly, an embodiment enabling the specification of a more efficient option when it will accommodate the needed result is an improved data processing machine.

Metric determination area 3030 may be used to display or specify information of a metric definition related to aspects of a search query that determine a value for the metric from the data selected by the search query. Metric determination area 3030 of interface 3000 is shown to include calculation category component 3032, calculation line deletion action element 3034, metric component 3036, calculation component 3050, filter component 3052, units component 3054, operator component 3056, "Add new logic" action element 3058, and "Save logic" action element 3048.

Calculation category component 3032 is illustrated in this example as a drop-down selection box indicating a default or last-user-selected value of "New metric logic" as the calculation category. Other calculation categories made available by drop-down selection box 3032 may include, for example, "Built-in Metrics" and "Advanced Analytics". In one embodiment, the determination of a metric value in the "New metric logic" calculation category may be specified in terms of one or more calculation lines. Components 3034, 3036, 3050, 3052, 3054, 3056 of metric determination area 3030 together represent such a calculation line. Additional calculation lines may be displayed by the AMRS as the result of processing user indications of a desire for such additional calculation lines by interaction with "Add new logic" action element 3058, in one embodiment. In one embodiment, calculation line deletion action element 3034 enables a user to indicate a desire to delete the calculation line of which is part. The AMRS receiving such an indication may perform such a deletion and refresh or update the interface display 3000, accordingly.

Metric component 3036 is a drop-down selection box having an indication of the current selection 3038, a selection deletion/cancellation action component 3042, and a drop-down display action button 3040. In one embodiment, the selection list of drop-down selection box 3036 may be populated with the names of all metric fields/columns associated with any one or more nodes of the asset hierarchy associated with the metric being defined. In one embodiment, the selection list of drop-down selection box 3036 may be populated with the names of all metric fields/columns that is each associated with all of the nodes of the asset hierarchy associated with the metric being defined. Other embodiments are possible. Calculation component 3050 is shown as a drop-down selection box displaying an indication of the currently selected calculation, here shown as "Average". The calculation option indicated by calculation component 3050 is the calculation or other processing performed over the values for the field identified at 3036 in the selected data during the execution of the search query. An entry of filter criteria at 3052 may be used to limit the calculation of 3050 over the values of the field of 3036 for something less than all of the data selected using the criteria of 3020 alone.

An entry of a units value and units component 3054 may be utilized by the AMRS to tag or label calculation results internally or for external displays, or may be utilized by the AMRS for normalization of different values to a common unit. Operator component 3056 is a drop-down selection list enabling the user to make a selection of an operation to be performed between the calculation of the calculation line in which operator component 3056 appears and a subsequent calculation line as may be added by interaction with action element 3058. In one embodiment, the selection list of operator component 3056 may be populated with operators including AND, OR, +, −, /, ×, and %, for example.

Metric time factor area 3060 may be used to display or specify information of a metric definition for time-related aspects of the search query. Metric time factor area 3060 is shown to include schedule component 3062 and span component 3064. Span component 3064 is shown as a drop-down selection list displaying "per hour" as the current selection by default, prior user interaction, or other means. The AMRS processes an indicated selection of span component 3064 to determine a search query, aspects, or portions that cause the executed search query to match, select, filter, or identify the data pertaining only to the selected time span. While the indicated value for the span component 3064 is, in a sense, internal to the search query, affecting the processing an execution of the search query will perform, in one embodiment, an indicated value for schedule component 3062 is, in a sense, external to the search query, not affecting the processing an execution of the search query will perform, but rather affecting when and/or how often the search query is performed. Schedule component 3062 is shown as a drop-down selection list displaying "1 minute" as the current selection by default, prior user interaction, or other means. In one embodiment, the drop-down selection list of schedule component 3062 may include 1 minute, 5 minutes, 10 minutes, 15 minutes, 20 minutes, 30 minutes, 1 hour, 2 hours, 4 hours, 6 hours, 12 hours, 1 day, 2 days, 3 days, and 7 days, as available options, for example.

Footer area 3004 of interface 3000 is shown to include Cancel action button 3070, Next action button 3072, and Finish action button 3074. In response to receiving an indication of user interaction with Finish action button 3074, the AMRS of one embodiment may create and store a proper representation of metric definition in computer storage, including representations of associations between the metric and one or more nodes of the asset tree, and may cause navigation to another user interface, perhaps interface 2900 of FIG. 18. In response to receiving an indication of user interaction with Next action button 3072 of FIG. 19, the AMRS of one embodiment may create and store a proper representation of metric definition in computer storage, including representations of associations between the metric and one or more nodes of the asset tree, and then cause navigation to a user interface for configuring conditions and alerts based on the metric, such as the interface illustrated and described in relation to FIG. 20.

Figure 20:
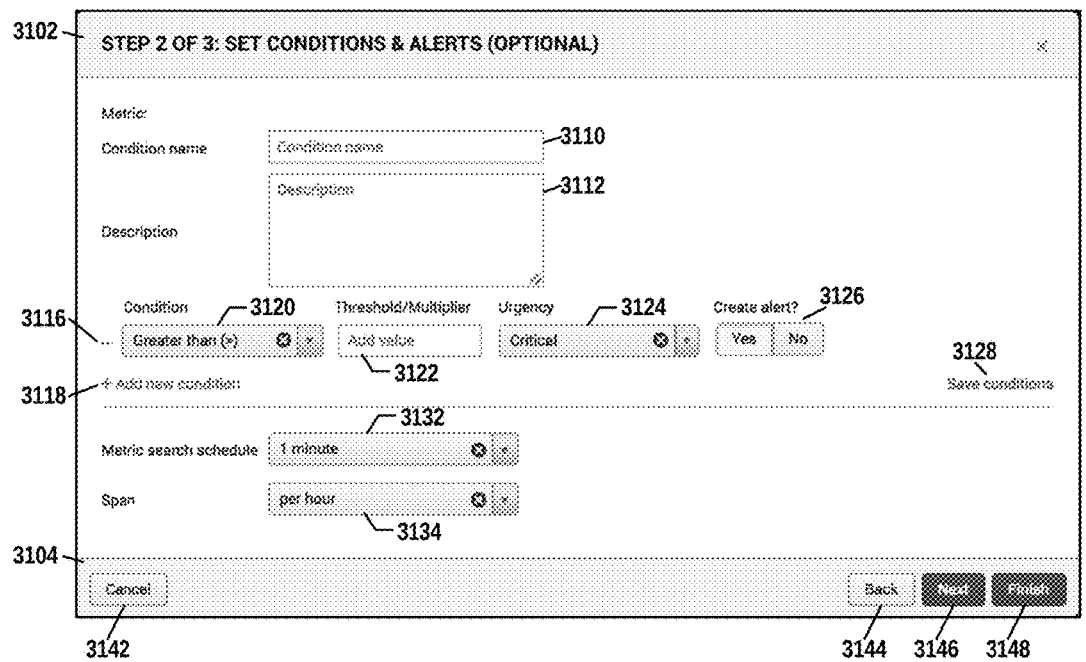
FIG. 20 illustrates a user interface display for a metrics condition and alerts console function.

FIG. 20 illustrates a user interface display for a metrics condition and alerts console function. In an embodiment of an AMRS, interface 3100 of FIG. 20 may be caused to be displayed on a user interface device in response to user interaction with "Next" action button 3072 of FIG. 19 or Edit action button 2972 of FIG. 18. When interface 3100 of FIG. 20 is displayed in response to user interaction with "Next" action button 3072 of FIG. 19 the data information components of the user interface may be empty, contain default values, and/or display tips to the user regarding the use of the component. When interface 3000 of FIG. 19 is displayed in response to user interaction with Edit action button 2972 of FIG. 18 the data information components of the user interface may be populated with information values from an existing condition/alert definition. Interface 3100 of FIG. 20 is shown to include header area 3102, footer area 3104, condition name component 3110, condition description component 3112, condition line deletion action component 3116, condition operator component 3120, threshold/multiplier component 3122, urgency component 3124, alert option component 3126, "Add new condition" action element 3118, "Save conditions" action element 3128, condition schedule component 3132, and condition span component 3134. Header area 3102 of interface 3100 is shown to include a title or caption for the interface.

In this illustrative example, the condition name component 3110 is an interactive text box used by the AMRS to display information it has for the name or identifier of the condition and to receive indications of a user-desired value for the name or identifier of the condition. Similarly, the condition description component 3112 is an interactive text box used by the AMRS to display information it has regarding a description for the condition and to receive indications of a user-desired value for a description for the condition.

Footer area 3104 of interface 3100 is shown to include Cancel action button 3142, Back action button 3144, Next action button 3146, and Finish action button 3148. In response to receiving an indication of user interaction with Finish action button 3148, the AMRS of one embodiment may create and store a proper representation of a condition definition in computer storage, and may cause navigation to another user interface, perhaps interface 2900 of FIG. 18. In response to receiving an indication of user interaction with Back action button 3144 of FIG. 20, the AMRS of one embodiment may create and store a proper representation of a condition definition in computer storage and then cause navigation to a prior user interface. In response to receiving an indication of user interaction with Next action button 3146, the AMRS of one embodiment may create and store a proper representation of a condition definition in computer storage and then cause navigation to a user interface for configuring actions based on the condition, such as the interface illustrated and described in relation to FIG. 21.

In one embodiment, the determination of a condition may be specified in terms of one or more condition lines, much as the determination of a metric value may be specified in terms of calculation lines as described in reference to FIG. 19. Components 3116, 3120, 3122, 3124, and 3126 of FIG. 20 may together represent such a condition line. Additional condition lines may be displayed by the AMRS as the result of processing user indications of a desire for such additional condition lines by interaction with "Add new condition" action element 3118, in one embodiment. In one embodiment, condition line deletion action element 3116 enables a user to indicate a desire to delete the condition line of which is part. The AMRS receiving such an indication may perform such a deletion and refresh or update the interface display 3100, accordingly.

Condition operator component 3120 is a drop-down selection box having an indication of the current selection, here shown as "Greater than (>)", which may be a default or last-user-selected value. Inasmuch as the value selected for the condition operator component is a comparison operator, its first comparand is the value of the metric with which it is associated, and its second comparand is the value displayed and/or specified via threshold/multiplier component 3122. Threshold/multiplier component 3122 is depicted in interface 3100 as an editable text box enabling a user to indicate new values or edit those previously displayed by the AMRS. During operation of the AMRS to perform asset monitoring and reporting in accordance with a condition and alert definition established by the use of interface 3100, a determination may be made by the AMRS that a condition specified by the combination of a metric value, a condition operator, and a threshold/multiplier value, has been met. As a result of that determination, the AMRS may perform or cause actions that may include recording a condition event record, as one example. In an embodiment, actions performed or caused by the AMRS as the result of such a determination may be characterized, classified, or attributed with an urgency level displayed and/or indicated at definition time by urgency component 3124 of interface 3100. In the example where a condition event record is recorded upon determination of the condition, the event record may include an urgency field having a value taken from the condition definition. In one embodiment, where multiple conditions are defined for a metric using multiple condition lines of an interface such as 3100, the conditions may be effectively evaluated for the metric in the order in which they were defined, and a first successful condition determination may terminate the search for any other satisfied condition. In one embodiment, where multiple conditions are defined for a metric using multiple condition lines of an interface such as 3100, the conditions may each be evaluated in a particular instance without regard to the success of any other, and multiple conditions may be determined to be satisfied and may be processed as such. These and other embodiments are possible.

Alert option component 3126 is shown for interface 3100 as a binary set of mutually exclusive selection buttons. Other embodiments are possible. The selection indicated by alert option component 3126, whether by default or by user interaction, is reflected in the definition information for the condition.

During operation of the AMRS to perform asset monitoring and reporting in accordance with a condition and alert definition established by the use of interface 3100, a determination may be made by the AMRS that a condition specified by the combination of a metric value, a condition operator, and a threshold/multiplier value, has been met. As a result of that determination, the AMRS may perform one or more alert actions which performance, itself, may be conditioned directly or indirectly on the alert option value reflected in the definition information for the condition. In one embodiment, an alert action may include posting an alert event to an event data store. In one embodiment, and alert action may be an action defined through the use of a user interface such as that depicted and described in relation to FIG. 21.

In one embodiment, an AMRS may utilize the processing of a DIQ to perform search queries against metrics data to make determinations regarding the satisfaction of one or more conditions. In such an embodiment, interface components 3132 and 3134 of interface 3100 may be used to display and indicate time related values for such a search query. Condition schedule component 3132 may be used to display and indicate a desired value for a frequency with which to schedule the condition satisfaction search query. Condition span component 3134 may be used to display and indicate a desired value that determines the duration of the time span of data considered by an execution of the condition satisfaction search query.

Figure 21:
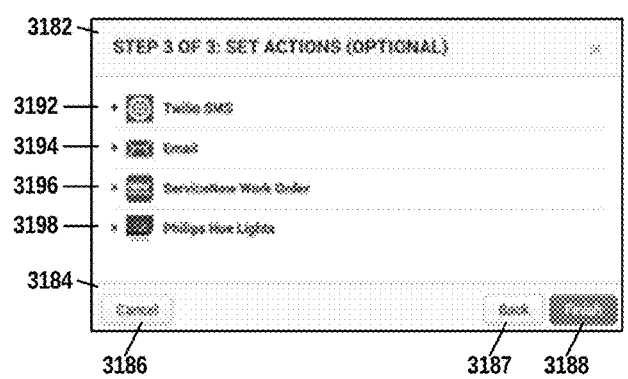
FIG. 21 illustrates a user interface display for an actions console function.

FIG. 21 illustrates a user interface display for an actions console function. In an embodiment of an AMRS, interface 3180 of FIG. 21 may be caused to be displayed on a user interface device in response to user interaction with "Next" action button 3146 of FIG. 20 or Edit action button 2976 of FIG. 18. Interface 3180 of FIG. 21 is shown to include header area 3182, footer area 3184, and for action-type elements 3192, 3194, 3196, and 3198. Header area 3182 is shown to display a title or caption for the interface. Each of action-type elements 3192, 3194, 3196, and 3198 represents a defined action of a particular type that may be performed, initiated or caused by processing of the AMRS in association with condition/alert processing such as may be defined or configured via a user interface such as interface 3100 FIG. 20. The defined actions may be parameterized or otherwise configurable or customizable. In one embodiment, a defined action may be packaged as a form of plug-in or extension module for the AMRS, and such a module may include sufficient computer instructions, code, scripts, or the like, media properties (e.g., icons), and any other related data, to enable the use of the defined action in the AMRS environment. In one embodiment, user interaction with an action-type element may result in the AMRS simply activating the defined action and possibly updating interface display 3180 to indicate the activation, perhaps by changing some aspect of the visual appearance of the corresponding action-type element (e.g., background color). Such processing may be useful in the case of the defined action that has no customizable or configurable parameters, or that has customizable or configurable parameters the values for which can be automatically determined using system or user profile information, for example. In one embodiment, user interaction with an action-type element may result in the AMRS causing the display of a different user interface or additional user interface components that enable a user to indicate customization or configuration information for the defined action instance. These and other embodiments are possible. Example action-type elements shown for interface 3180 include action-type element 3192 corresponding to a defined action of sending an SMS message (specifically via the Twilio service), action-type element 3194 corresponding to a defined action of sending an e-mail message (perhaps using IMAP), action-type element 3196 corresponding to a defined action of creating a work order in an incident tracking system (here, specifically a ServiceNow® system), and action-type element 3198 corresponding to a defined action of a change in lighting color (here, specifically via Philips Hue Lights control technology).

Footer area 3184 is shown to include Cancel action button 3186, Back action button 3187, and Finish action button 3188. In response to receiving an indication of user interaction with Finish action button 3188, the AMRS of one embodiment may create and store a proper representation of an action definition in computer storage, and may cause navigation to another user interface, perhaps interface 2900 of FIG. 18. In response to receiving an indication of user interaction with Back action button 3187 of FIG. 21, the AMRS of one embodiment may create and store a proper representation of an action definition in computer storage and then cause navigation to a prior user interface.

Figure 22:
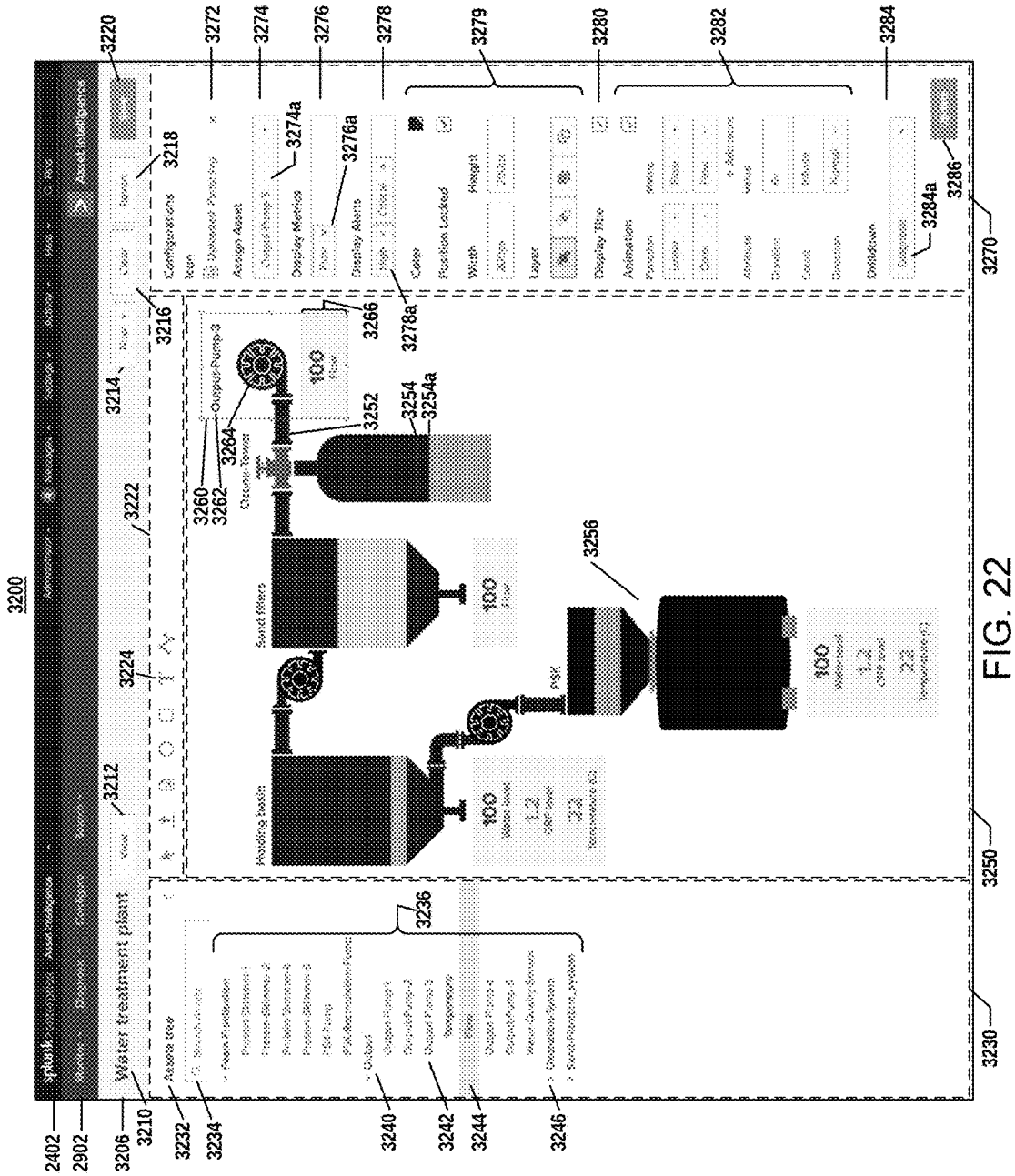
FIG. 22 illustrates a user interface display for creating or editing a custom monitoring or reporting presentation for an asset tree.

FIG. 22 illustrates a user interface display for creating or editing a custom monitoring or reporting presentation for an asset tree. Interface 3200 of FIG. 22 is such as might be caused to display during the processing associated with block 2346 of FIG. 12, for example. In one embodiment, a custom monitoring or reporting presentation for asset tree information may be termed a display or presentation view, and a view instance produced by the AMRS during the performance of its monitoring and reporting processes may be based on a view template that is configured and/or customized by the user. In one embodiment, such a view may be considered a dashboard, and its template a dashboard template. Interface 3200 of FIG. 22 illustrates one possible embodiment of a user interface whereby a user may create, configure, and/or customize such a view template.

Interface 3200 of FIG. 22 is shown to include system header bar 2402, application information and menu bar 2902, function header bar 3206, asset display area 3230, toolbar 3222, view template display area 3250, and configuration display area 3270. System header bar 2402 and application information and menu bar 2902 are as described for identically numbered elements appearing in, and described in relation to, depictions of user interface displays in earlier figures.

Function header bar 3206 is an embodiment of a header bar as may be useful in an interface associated with the function of creating, configuring, and/or customizing a view template. Function header bar 3206 is shown to include title 3210, display mode action button 3212, timeframe component 3214, Clear action button 3216, Revert action button 3218, and Save action button 3220. Except for title 3210, interface components of function header bar 3206 of this illustrative example are interactive elements that enable a user to make indications of data values and desired actions, for example, to AMRS functionality, which the AMRS computing machinery can then process according to its design, circuitry, and programming.

Display mode action button 3212 enables the user to request a toggling action between two alternate display modes. An editing display mode is represented in interface 3200 of FIG. 22 as it appears and provides user interface components for creating, configuring, and/or customizing (i.e., editing) a view template. When in editing display mode, display mode action button 3212 displays the name of the alternate display mode, i.e., "View". A user interaction with display mode action button 3212 may result in the transition to a View mode user interface display where a full-screen or near full-screen view is presented based on the current working state of the view template under construction. Timeframe component 3214 may be a drop down selection list interface component that enables a user to indicate a desired time or time frame of data to use in relation to data-driven or data-aware elements that may be included in a view template. A user interaction with Clear action button 3216 in an embodiment may cause the view template under construction to be emptied of all of its content. A user interaction with Revert action button 3218 in an embodiment may have the effect of causing recent changes made to a view template to be abandoned. In one embodiment a user interaction with Revert action button 3218 may cause the abandonment of only the single most recent change to the view template. In one embodiment, a user interaction with Revert action button 3218 may cause the abandonment of all changes made to the view template since the last time Save action button 3220 was activated. In one embodiment, a user interaction with Revert action button 3218 may cause the abandonment of all changes made to the view template since the last time an autosave action was performed by the AMRS console processor. Other embodiments are possible. A user interaction with Save action button 3220, in one embodiment, may cause the current configuration of the view template under construction to be reflected in computer storage anyway such that it may be recalled or restored, perhaps by reflecting the configuration information in a named file in the filesystem of a host computer.

Asset display area 3230 is shown to include area title 3232, asset search component 3234, and asset node list 3236. Asset node list 3236 has similar content, organization, appearance, and formatting to asset node lists of user interfaces illustrated and discussed in relation to earlier appearing figures. Similarly, a working understanding of asset search component 3234 may be developed by consideration of what has come before. Asset node list 3236 is shown to include asset node list entry 3240 representing the level 1 asset node named "Output", asset node list entry 3242 representing a child of the "Output" node, named "Output Pump-3", and asset node list entry 3244 representing a child of the "Output Pump-3" node, named "Flow". "Flow" asset list node entry 3244 is shown as having a darker background color than the other asset node list entries, indicating that it is the currently selected asset node list entry.

Toolbar 3222 is shown as having a number of tool icons such as "T" icon 3224. Icons in toolbar 3222 may be selected by a user interaction to cause a particular effect, engage a particular function, and/or begin a particular operational mode. For example, in one embodiment, a mouse click on icon 3224 may cause the addition of an empty, default-sized text display element to the view template under construction, causing it to appear at a default location in view template display area 3250, and engaging an operational mode for entering text into the newly introduced text display element. In an embodiment, many of the tools represented in toolbar 3222 may be associated with adding different types of elements to the view template, and with manipulating the elements that are present in the template. In one embodiment, one or more tool icons may be associated with static elements that may be included in the design of the view template. Such static elements may include text blocks or labels, imported graphical imagery (e.g., icons, picture files, videos, fixed animations), or drawing elements such as shapes and lines. In one embodiment, one or more tool icons may be associated with dynamic elements that may be included in the design of the view template. Such dynamic elements may be data-driven or data-aware and may determine one or more aspects of their appearance or behavior at a point in time based on currently supplied data. Such data-driven or data-aware dynamic elements may be referred to as "widgets" in one AMRS embodiment. In one AMRS embodiment, a monitoring/reporting processor, and CCC console processor functions related thereto, may include functionality to implement a number of built-in widgets and may further include functionality to implement an extensible widget framework which functionality may include, for example, functionality to recognize, install, or activate widget modules, and functionality to exercise the content of those modules. In one such embodiment, widget modules may be packaged after the fashion of programming objects and have attributes or properties (associated data) and methods or behaviors (programmed actions) which may be accessible and/or exercisable by a recognized interface. In one embodiment, a supported widget may be limited to receiving a single data factor or component that drives it, such as the data of a particular metric for a particular asset. In one embodiment, a supported widget may be able to receive multiple data factors or components to drive it, such as the data of different metrics that may be associated with the same asset. These and other embodiments are possible.

View template display area 3250 is shown to include a representation of some or all of the view template currently under construction. (For example, a representation of only some of the current view template may appear in display area 3250 where display area 3250 is smaller than the size of the current view template. In such a case, view template display area 3250 may be scrollable.) The current view template is shown to include static graphical elements including, for example, pipe segment icon/shape/picture 3252. The current view template is further shown to include multiple dynamic elements including widgets 3254, 3256, and 3260. Widget 3254 is used to depict an Ozone-Tower asset and presents a graphical depiction of a tank or tower. Data of a fill-level metric associated with the Ozone-Tower asset may drive the appearance of the widget, for example, by adjusting the position of the boundary 3254a between a lower, blue, fill portion and an upper, black, empty portion of the tank/tower depiction. Widget 3256 is used to depict a protein skimmer (PSK) asset and presents a graphical depiction of a protein skimmer apparatus with three metric presentation blocks or tiles beneath it. Data related to a Water-level metric, an ORP-Level metric, and a Temperature metric may drive the appearance of the widget, and, particularly, the current value for each of the metrics is displayed in a corresponding one of the metric presentation blocks or tiles of the widget, and an urgency level associated with each of the values determines the color of the text used to display the current value in the metric presentation blocker tile (for example, the value of 100 for the Water-level metric may be associated with a critical urgency level and so may display in red). In one embodiment, the metric presentation blocks or tiles discussed in relation to widget 3256 may each be an independent widget.

Widget 3260 is used to depict an asset named "Output-Pump-3". The appearance of the bounding box with control points around widget 3260 may indicate that widget 3260 is the active element of the current view template. In one embodiment, the active element of the current view template may have its detailed configuration information presented in configuration display area 3270. Widget 3260 is shown to include a title 3262 that corresponds to the name 3274a of the asset designated as the assigned asset of the widget as seen in the assigned asset area 3274 of configuration display area 3270. Widget 3260 is further shown to include pump icon 3264 which comes from a Pump.svg file as seen in icon area 3272 of configuration display area 3270. Widget 3260 is further shown to include metric display block/tile 3266 which is driven by the data for a Flow metric as seen by metric token 3276a in the Display Metrics area 3276 of configuration display area 3270. Configuration display area 3270 is shown to further include Display Alerts area 3278 where defined alerts to be displayed in association with the widget are represented by tokens, such as 3278*a*; general drawing attributes area 3279; title display option area 3280; data-driven animation control section 3282; drilldown area 3284 where a user interface navigation target 3284*a*, such as a Diagnose interface display, is defined to use in circumstances where a user double clicks or performs some other specified interaction with the displayed widget; and update action button 3286 which enables a user to indicate the desire to synchronize the representation of the widget displayed in 3250 with the representation of its configuration information displayed and 3270.

It is noted that a widget-depicted asset may have a corresponding asset node list entry visible in asset display area 3230, or not—as in the case where a superior node of the asset is in a collapsed state in asset node list 3236. For example the Ozone-Tower asset represented by widget 3254 may be subordinate in the asset hierarchy to the high level Ozonation-System asset represented by list entry 3246, but because the Ozonation-System list entry 3246 is in a collapsed state, as indicated by the ">" character in the entry, a list entry for the Ozone-Tower is suppressed and not visible.

When the creation, construction, editing, or such for a view template is complete, a user may activate Save action button 3220 to safely fix a definition/configuration of the view template in computer storage and exit interface 3200.

The user interfaces already discussed in relation to asset hierarchy monitoring and reporting, namely, the user interfaces illustrated and discussed in relation to FIGS. 13, 15, 16, 17, 18, 19, 20, 21, and 22, have largely related to interfaces employed by a command, control, and configuration console processor (such as CCC console 2134 of FIG. 10). These interfaces enable a user, such as a system administrator or operator, to manipulate the virtual levers, buttons, dials, and switches (embodied in the information of a CCC data store such as 2132 of FIG. 10) that control the operation of the asset monitoring and reporting machine. The focus now turns with the discussion of the figures that follows to the output side of the work performed by the AMRS machinery. Figures that follow relate largely to reporting interfaces that may be utilized by the AMRS during the processing described and contemplated for block 2350 of FIG. 12 as performed by a monitor/reporter processor such as 2142 of FIG. 10, for example.

3.3 Asset Hierarchy Monitoring/Reporting

Figure 23:
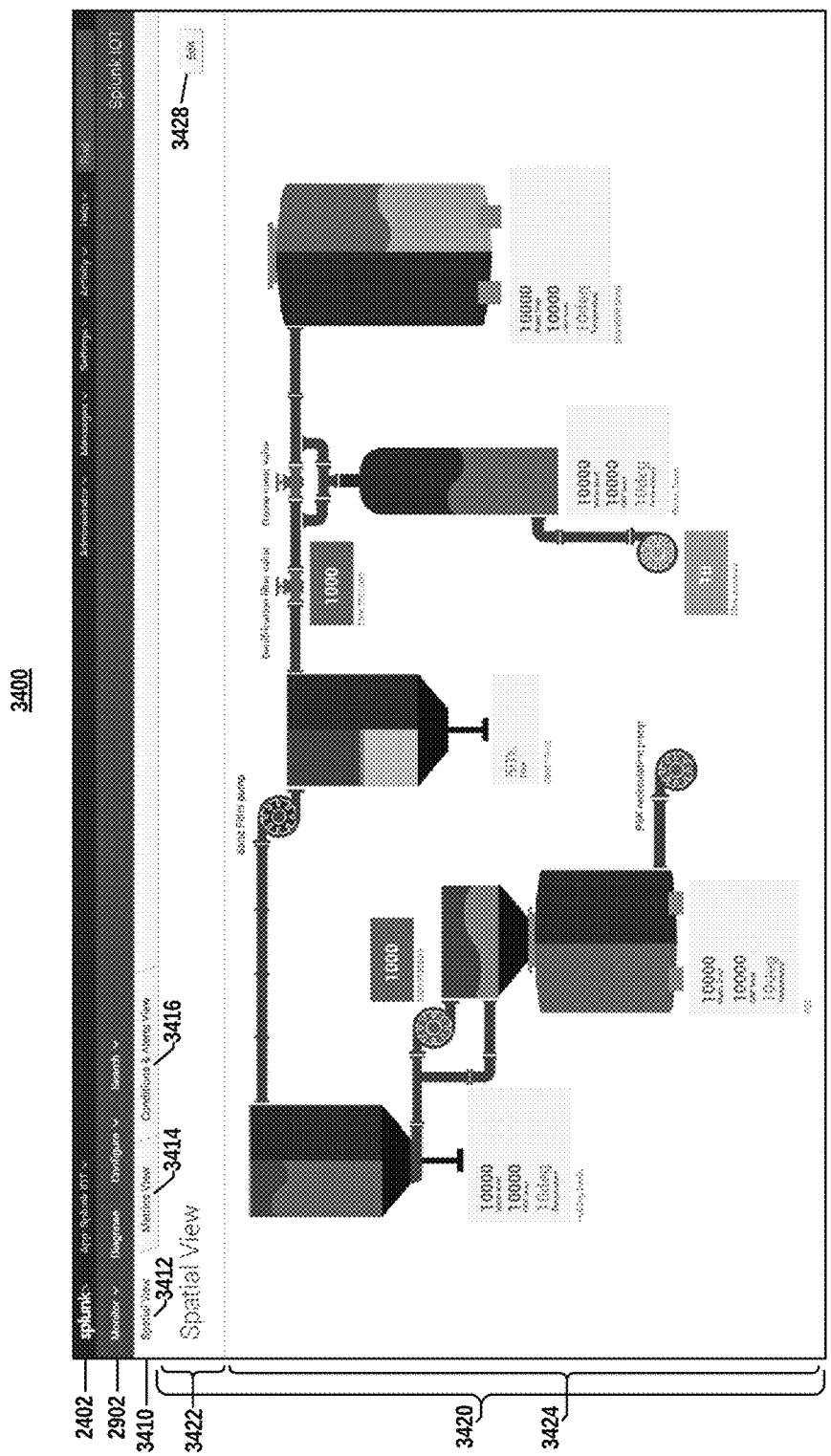
FIG. 23 illustrates a user interface display of a custom asset tree presentation.

FIG. 23 illustrates a user interface display of a custom asset tree presentation. Interface 3400 of FIG. 23 may be used with great effect to report against a defined asset tree hierarchy with a dynamic and highly customized presentation based on a view template as may have been created using an interface such as 3200 of FIG. 22. Interface 3400 FIG. 23 is shown to include system header bar 2402, application information and menu bar 2902, tab controls area 3410, and active tab display area 3420. System header bar 2402 and application information and menu bar 2902 are as described for identically numbered elements appearing in, and described in relation to, depictions of user interface displays in earlier figures. Tab controls area 3410 is shown to include three tab controls, 3412, 3414, and 3416, each corresponding to a different presentation model for asset related data. Tab interfaces are understood in the art and will not be elaborated here. Tab 3412, "Spatial View" is shown to be the active tab.

Active tab display area 3420 is shown to include spatial view header area 3422, and main display area 3424. Spatial view header area 3422 is shown to include a title indicative of the presentation model associated with the tab, but in another embodiment may additionally or alternatively include a title indicative of the asset tree being reported or indicative of the particular view template used to generate the display content. Other embodiments are possible. Spatial view header area 3422 is further shown to include Edit action button 3428 which may enable a user to navigate to an interface such as 3200 of FIG. 22 in order to modify the view template on which the presentation of user interface 3400 of FIG. 23 is based. Main display area 3424 presents a display based on a view template and instantiated using current data. Monitor/reporter processor 2142 of FIG. 10 may, on some continuous basis, update or refresh the content of main display area 3424 using updated or refreshed data.

Figure 24:
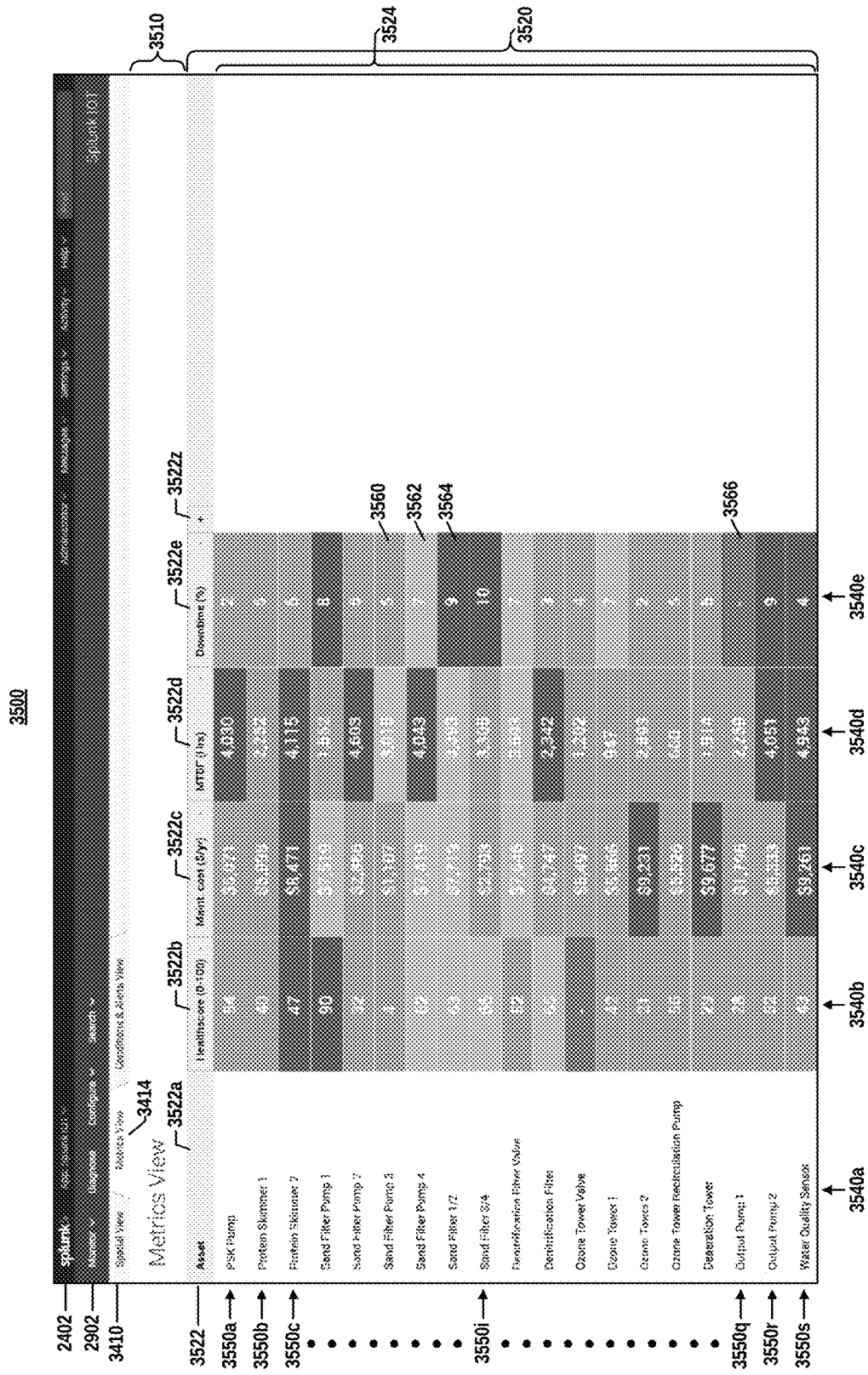
FIG. 24 illustrates a user interface display for a metrics view.

FIG. 24 illustrates a user interface display for a metrics view. Interface 3500 of FIG. 24 is shown to include system header bar 2402, application information and menu bar 2902, tab controls area 3410, metrics view header area 3510, and main display area 3520. System header bar 2402, application information and menu bar 2902 and tab controls area 3410 are as described for identically numbered elements appearing in, and described in relation to, depictions of user interface displays in earlier figures. Tab 3414, "Metrics View" is shown to be the active tab. Main display area 3520 is shown to make a presentation of assets related metrics data in a tabular format. Main display area 3520 is shown to include column header 3522 and table data area 3524. Column header 3522 is shown to include column headings 3522*a-e* which correspond respectively to the columns of the table 3540*a-e*. Column heading 3522*a* displays "Asset" as the heading for first column 3540*a*. Data in column 3540*a* for each of table rows 3550*a-s* is the name or identifier of an asset node to which all of the data appearing in the row pertains. The remainder of the column headings 3522*b-e* each contain the name of the metric for which measurement data appears in the column, and an indication of the relevant "Unit" or unit-of-measure designation that denominates the measurement values for the metric. Column header 3522 is further shown to include an add-column action button 3522*z*. Interaction with ad-column action button 3522*z* may cause the appearance of another data column in the tabular display and a selection list populated as with the names of available metrics associated with nodes of the asset hierarchy. A user may indicate a selection from the list and the monitor/reporter processor of the AMRS will place the name of the indicated selection, along with the appropriate Unit value in the column heading of the new column and will populate measurement for that data into each row of the table, as available. When populating measurement data for the metrics into the rows of the table, generally, an embodiment may further determine a visual attribute or ornament for each cell that corresponds to an urgency level associated with the value of the measurement for the metric represented in the column. In the illustrative embodiment of FIG. 24, the background color of a table cell is the visual attribute used for indicating the urgency level associated with the measurement value. Accordingly, different background colors can be seen in the cells and, for example, the 5% measurement value for a Downtime metric as seen in cell 3560 may be considered a normal urgency value and so display with the background color of green, while the 7% measurement value for the Downtime metric as seen in cell 3562 may be considered a warning urgency value and so display with a background color of yellow, while the 9% measurement value for a Downtime metric as seen in cell 3564 may be considered a critical urgency value and so display with the background color of red. Notably, cell 3566 displays with a background color of gray indicating that there is no measurement data for the reported time period, for the metric indicated by the column of cell (3540e) and the asset indicated by the row of the cell (3550q). Such a condition may exist, for example, where the column metric is not relevant to the row asset, or where machine data used for the measurement was not produced, lost, or delayed.

Figure 25:
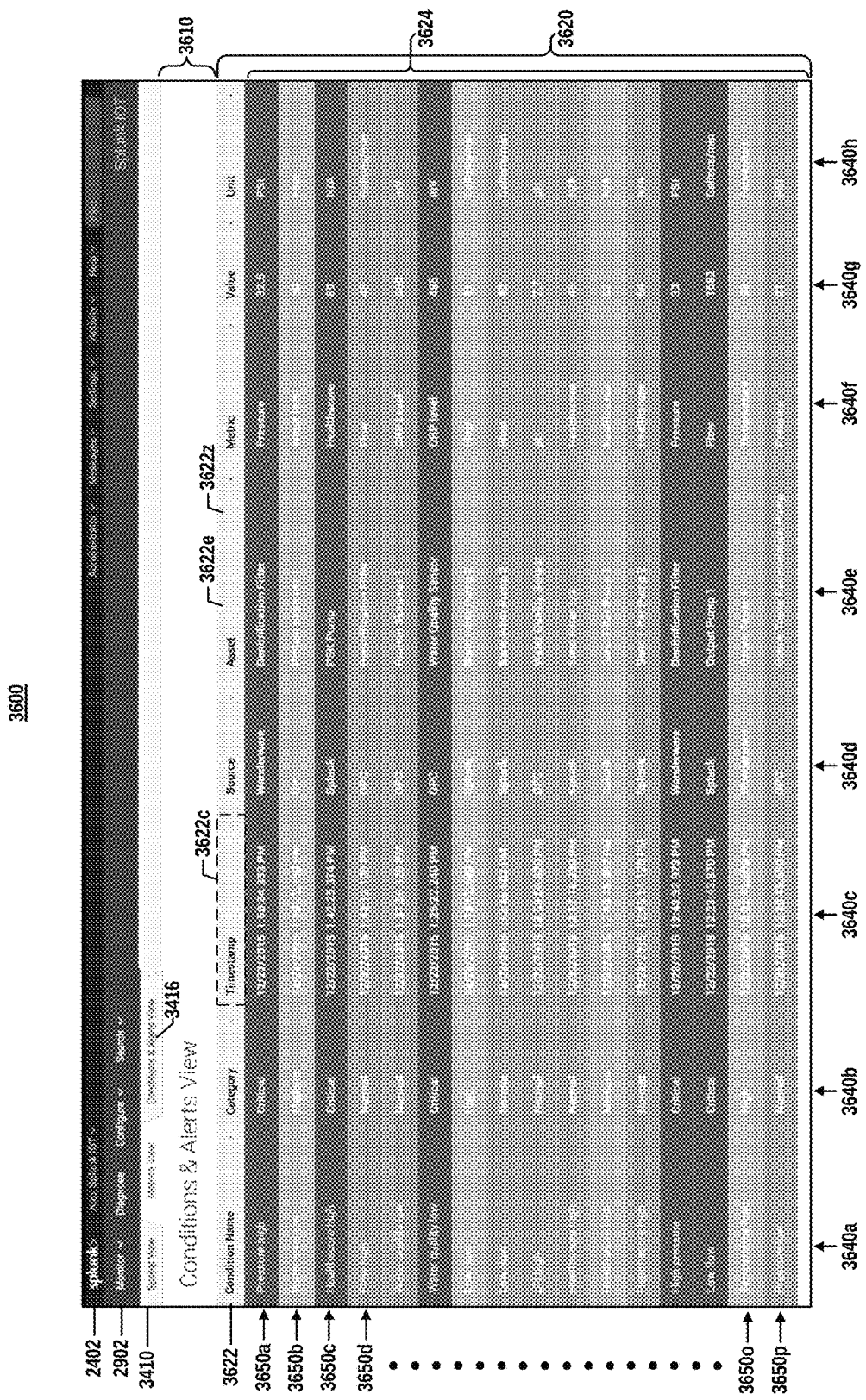
FIG. 25 illustrates a user interface display for a conditions and alerts view.

FIG. 25 illustrates a user interface display for a conditions and alerts view. Interface 3600 of FIG. 25 is shown to include system header bar 2402, application information and menu bar 2902, tab controls area 3410, conditions and alerts view header area 3610, and main display area 3620. System header bar 2402, application information and menu bar 2902, and tab controls area 3410 are as described for identically numbered elements appearing in, and described in relation to, depictions of user interface displays in earlier figures. Tab 3416, "Conditions & Alerts View" is the active tab. Main display area 3620 is shown to make a presentation of conditions and alerts data in a tabular format. Main display area 3620 is shown to include column header 3622 and table data area 3624. Column header 3622 is shown to include column headings respectively corresponding to the columns of the table 3640a-h, namely, "Condition Name", "Category", "Timestamp", "Source", "Asset", "Metric", "Value", and "Unit". The rows of table data area 3650a-p are by default populated with conditions and alerts event information in reverse chronological order, i.e., in descending order under Timestamp column heading 3622c. The background color of each row is determined by the urgency category associated with the row. Rows with "Normal" appearing in their "[urgency] Category" column have a green background; rows with "Medium" appearing in their "[urgency] Category" column have a yellow background; and rows with "Critical" appearing in their "[urgency] Category" column have a red background.

Figure 26:
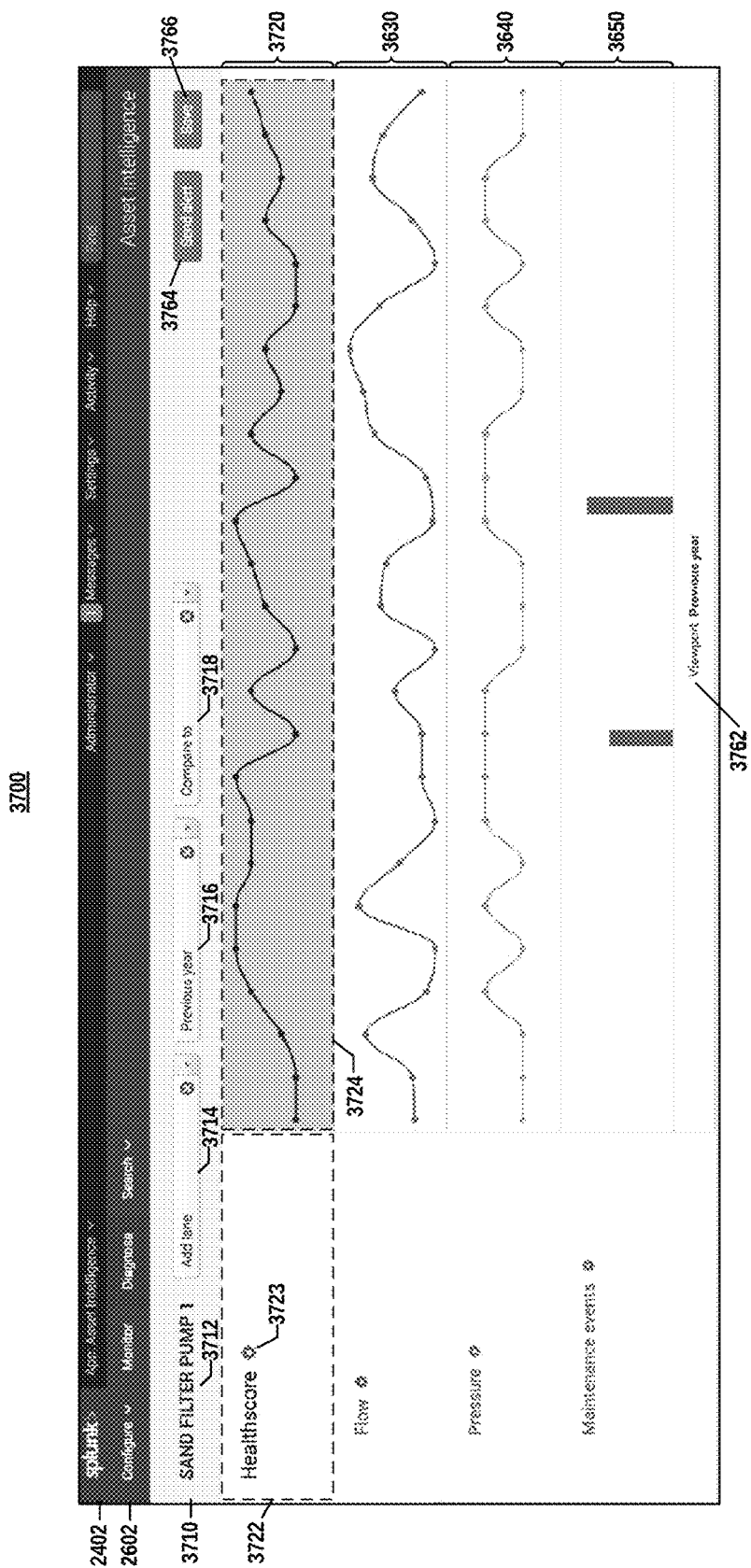
FIG. 26 illustrates a user interface display for a diagnostics view.

FIG. 26 illustrates a user interface display for a diagnostics view. Interface 3700 of FIG. 26 may provide a deep-dive or drill-down interface which may be a destination of choice for an analyst who observes or suspects a problem based on information in a higher-level and/or less detailed display, and then needs to see the detail in order to diagnose the problem. As one example, a user may regularly monitor her water filtration system using the spatial view presentation of interface 3400 of FIG. 23. If at some point, its urgency category becomes critical, and the widget representing the Sand Filter pump goes red, the spatial view interface may be so configured that the user may interact with the Sand Filter pump, such as by double-clicking, to navigate directly to interface 3700 of FIG. 26. Interface 3700 is shown to include system header bar 2402, application information and menu bar 2602, diagnose header 3710, graph lanes 3720, 3630, 3640, and 3650, and viewport time range indicator 3762. System header bar 2402 and application information and menu bar 2602 are as described for identically numbered elements appearing in, and described in relation to, depictions of user interface displays in earlier figures. Diagnose header 3710 is shown to include asset identifier 3712, new lane selector 3714, timeframe selector 3716, comparison timeframe selector 3718, "Send alert" action button 3764, and "Save" action button 3766. In one embodiment, user interaction with new lane selector 3714 may cause the display of a selection list from which the user may indicate a selection of an available metric or other data source to populate an additional graph lane in interface 3700. In one embodiment, user interaction with timeframe selector 3716 may cause the display of a list of options for timeframe from which the user may indicate a desired selection. In response to receiving the user's indication of a selection the AMRS may cause search query executions to gather the data for the newly selected timeframe for each of the graph lanes displayed in the interface the AMRS may then update or refresh interface 3700 with the new data and may update viewport time frame indicator 3762 appropriately. In one embodiment, user interaction with comparison timeframe selector 3718 may cause the display of a list of options from which the user may select a timeframe of data to plot in the graph lanes for comparison against the primary timeframe as designated at 3716. Options in the selection list associated with 3718 may be absolute or relative timeframe options and embodiments may vary as to the manner in which the comparison data is presented in the graph lanes, for example, whether side-by-side, over-under, or superimposed. A user may interact with "Save" action button 3766 to save the current configuration and settings of interface 3700 as a template or pattern to reuse at some future date.

In one embodiment, each of the graph lanes of the diagnostics interface has a graph lane information and control portion and a graph viewport portion. For example, graph lane 3720 has graph lane information and control portion 3722 and graph viewport portion 3724. A graph lane information and control portion may include the name of the metric or other data source that provides the data represented in the graph viewport portion. Measurement data of the metric or data from another source may then be plotted or otherwise graphed or represented in the graph viewport portion of the graph lanes. An axis of the graph viewport portion represents a time dimension (often the long axis) and the graph lane data is depicted as a time series. In one embodiment, a common time axis is used for all of the displayed graph lanes. In one embodiment, the non-time axis may be auto scaled by AMRS processing determinations. In one embodiment, a Settings icon such as 3723 may be available for each of the graph lanes and enable a user to adjust various settings for the graph lane, for example, the graph style or color. These and other embodiments are possible.

Figure 27:
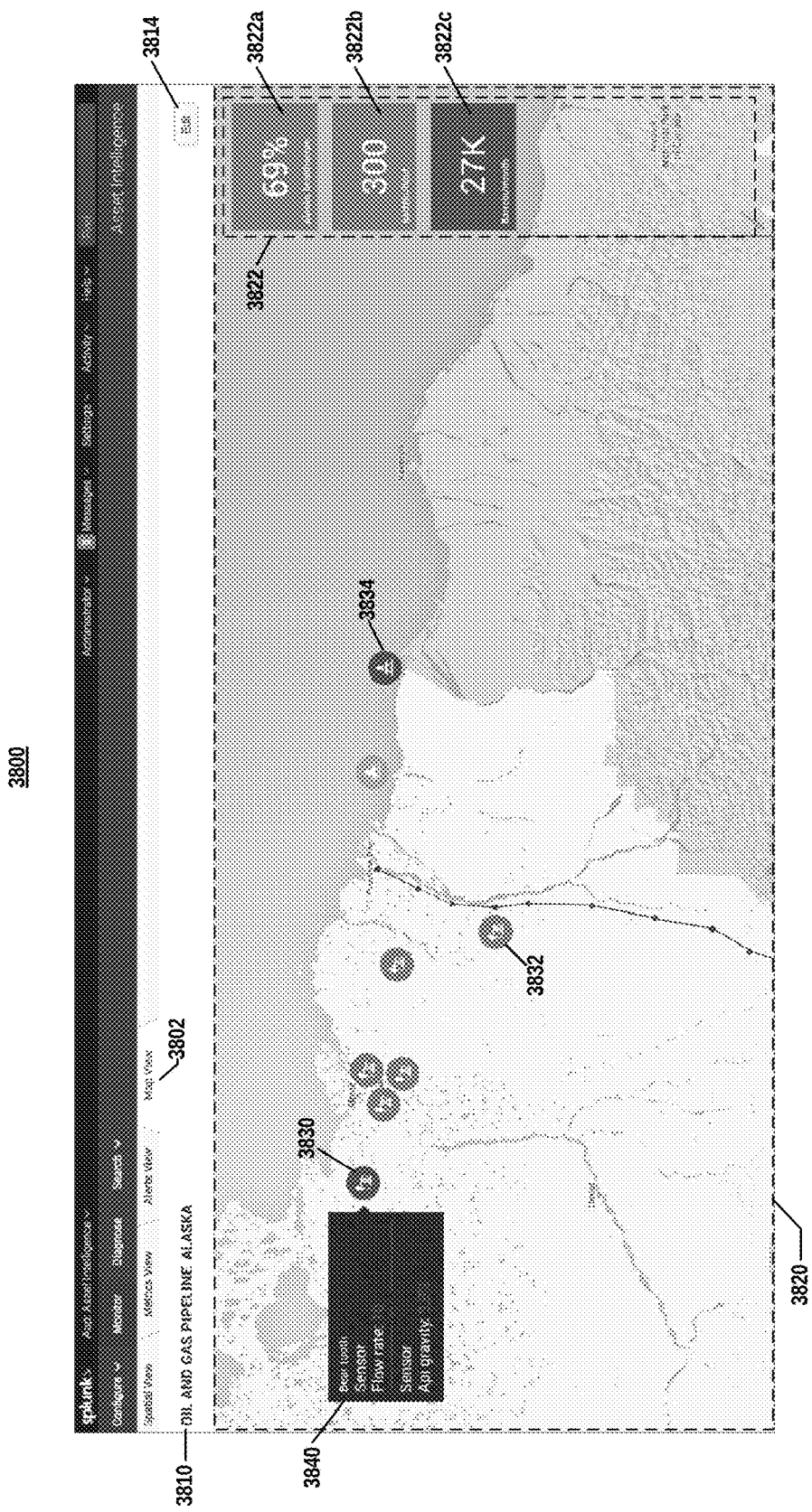
FIG. 27 illustrates a user interface display for a map view of asset tree data.

FIG. 27 illustrates a user interface display for a map view of asset tree data. Interface 3800 of FIG. 27 may make the map view visualization available to the user via a tab control 3802. The map view of 3800 is shown to include map header area 3810 displaying an name, title, or caption for the map, perhaps a name associated with the root node of the asset hierarchy. Map header area 3810 is further shown to include "Edit" action button 3814. User interaction with Edit action button 3814 in one embodiment may result in the presentation of a different or updated interface that enable the user to modify the content, layout, configuration, and definition of the map view template. A map view template may include static elements such as the image of the background map and may include dynamic, data-driven elements such as asset icons 3830, 3832, and 3834, for example, and such as metric widgets or tiles 3822a-c appearing in a metrics reporting area 3822. Defined metrics and conditions may be used to determine an urgency category and or one or more particular attributes of an asset icon in the map view, such as its color. User interaction with an asset icon such as a hover-over interaction with asset icon 3830 in one embodiment may result in the transient display of an asset information box 3840. Embodiments may vary greatly as to the amount and types of information presented in an asset information box which may include, for example, asset definition metadata, associated metric names, conditions and alerts, and any other information.

Figure 28:
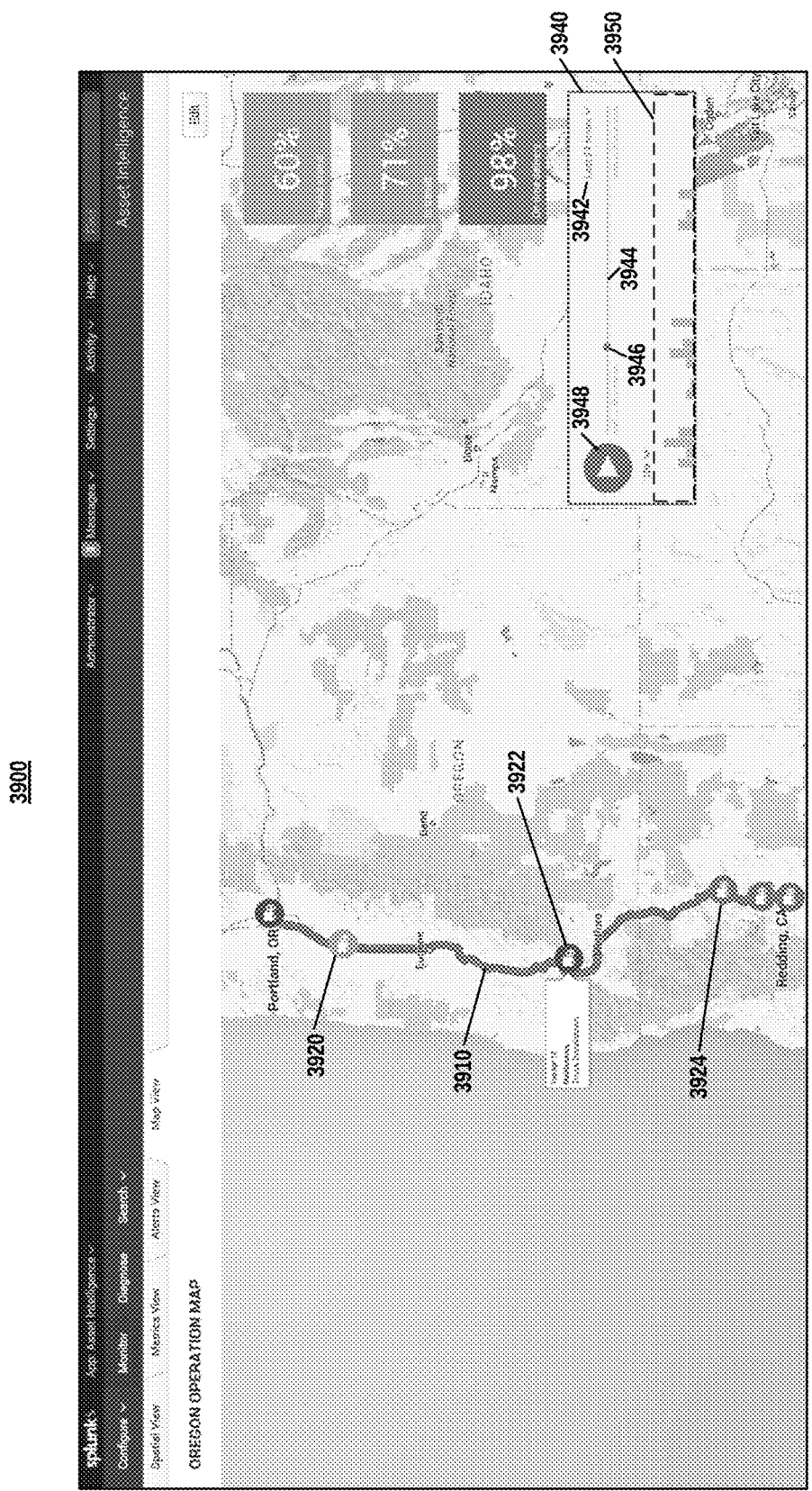
FIG. 28 illustrates a user interface display for a map you of asset tree data with a timeline.

FIG. 28 illustrates a user interface display for a map you of asset tree data with a timeline. Careful consideration of interface 3900 of FIG. 28 will reveal many similarities to interface 3800 of FIG. 27. Noteworthy differences include the representation of mobile rather than stationary assets by the icons of interface 3900, and the presence of timeline control and navigation block 3940. Timeline control and navigation block 3940 in many respects is a timeline player for the map. A linear timeline is depicted by baseline 3944 and the end-to-end duration, and the start and end times are determined by timeframe component 3942 which in one embodiment may be implemented as a drop down selection list. Time position indicator 3946 represents the point in time within the time frame represented by baseline 3944 that is currently represented by the map view. As the time position indicator 3946 moves to different positions along baseline 3944 one can expect that asset icons for mobile assets such as asset icons 3920, 3910, and 3924, which may represent trucks in a fleet, for example, will move to different positions in the map so as to show their location of record at the time indicated by time position indicator 3946 in the timeframe. Geographic points of interest and constructs thereof, for example, Route 3910, may also be included in the map view. In one embodiment, geographic points of interest and constructs may be used in the determination of conditions and alerts. For example, a critical urgency level may be indicated where a truck asset departs more than 2 miles from the route asset. Time position indicator 3946 may be moved along the timeline by click and drag interactions, in one embodiment. Time position indicator 3946 may be moved along the timeline in a steady progressive way by activating play button 3948. Timeline control and navigation block 3940 also includes timeline graph area 3950. An embodiment may enable the graphing of one or more time series into timeline graph area 3950. The data visualization in graph area 3950 (which may be in alignment with time baseline 3944) may provide a quick visual clue as to time periods that may present more useful information. These and other embodiments are possible.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Implementations that are described may include graphical user interfaces (GUIs). Frequently, an element that appears in a GUI display is associated or bound to particular data in the underlying computer system. The GUI element may be used to indicate the particular data by displaying the data in some fashion, and may possibly enable the user to interact to indicate the data in a desired, changed form or value. In such cases, where a GUI element is associated or bound to particular data, it is a common shorthand to refer to the data indications of the GUI element as the GUI element, itself, and vice versa. The reader is reminded of such shorthand and that the context renders the intended meaning clear to one of skill in the art where a distinction between a GUI element and the data to which it is bound is meaningful.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The preceding point may be elaborated with a few examples. Many details have been discussed and disclosed in regards to user interfaces including graphical user interfaces (GUIs). While it is convenient to describe inventive subject matter in terms of embodiments that include familiar technologies, components, and elements, the inventive subject matter should not be considered to be constrained to these, and the ready availability and appropriateness of substitutes, alternatives, extensions, and the like is to be recognized. What may be shown or described as a single GUI or interface component should liberally be understood to embrace combinations, groupings, collections, substitutions, and subdivisions in an embodiment. What may be shown or described as a single GUI or interface component may be embodied as an atomic or truly elemental interface component, or may readily be embodied as a complex or compound component or element having multiple constituent parts. What may be shown, described, or suggested to be a uniformly shaped and contiguous GUI or interface component, such as an interface region, area, space, or the like, may be readily subject to implementation with non-uniformly shaped or noncontiguous display real estate.

As yet one more example, apparatus that perform methods, processes, procedures, operations, or the like, disclosed herein may be referred to as a computer, computer system, computing machine, or the like. Any such terminology used herein should be reasonably understood as embracing any collection of temporarily or permanently connected hardware devices in combination with any software each requires to operate and perform operations and functions necessary to an implementation of an inventive aspect. Adopting such an understanding is consistent with modern computing practices and eliminates the need to obscure the disclosure of inventive aspects with catalogs of implementation options and alternatives.

As one final example, methods, procedures, or processes may be described herein by reference to flow charts or block diagrams and possibly in terms of sequences of steps or operations. It should be understood, however, that the practice of an inventive aspect is generally not limited to the number, ordering, or combination of operations as may be described for an illustrative embodiment used to teach and convey an understanding of inventive aspects possibly within a broader context. Accordingly, not all operations or steps described are illustrated may be required to practice of an inventive aspect. Different embodiments may variously omit, augment, combine, separate, reorder, or reorganize the performance of operations, steps, methods, procedures, functions, and the like disclosed or suggested herein without departing from an inventive aspect. Further, where sequences of operations may be illustrated, suggested, expressed, or implied, an embodiment practicing inventive aspects may perform one or more of those operations or sets of operations in parallel rather than sequentially.

Accordingly, inventive aspects disclosed herein should be considered broadly without unnecessary limitation by the details of the disclosure, and should be considered as limited only by accompanying claims or where reason demands it.

The invention claimed is:

1. A method comprising:
performing a search of data based at least in part on user-supplied criteria information, the data including operational machine data from one or more components of a system producing asset data;
causing display of at least a portion of a table, the table including a result of the search having a first column of asset identifier values and a second column of asset identifier values, each unique asset identifier value from among the first and second columns identifying a unique respective asset, and each of one or more unique asset identifier values having representation among the asset identifier values of the first column and among the asset identifier values of the second column;
receiving user input indicating the first column as an asset identifier column and the second column as an asset parent identifier column;
creating an asset hierarchy automatically based at least in part on the user input and the result of the search; and
wherein the method is performed by one or more processors.

2. The method of claim 1 wherein the system producing asset data is an industrial control system.

3. The method of claim 1 wherein the system producing asset data is an industrial control system performing supervisory control and data acquisition (SCADA) processing.

4. The method of claim 1 wherein the system producing asset data is an industrial control system performing remote monitoring and control processing.

5. The method of claim 1 wherein the machine data is further from one or more components of a second system producing asset data.

6. The method of claim 1 wherein the machine data is further from one or more components of a second system producing asset data, and wherein the system producing asset data is an industrial control system and wherein the second system producing asset data is not an industrial control system.

7. The method of claim 1 wherein the asset hierarchy comprises node information for a plurality of asset nodes, the node information for each asset node comprising an asset identification.

8. The method of claim 1 wherein the asset hierarchy comprises node information for a plurality of asset nodes, the node information for each asset node comprising an asset identification and an association to a parent asset node.

9. The method of claim 1 wherein the asset hierarchy comprises:
node information for a plurality of asset nodes; and
information associating a metric with one or more of the asset nodes.

10. The method of claim 1 wherein the asset hierarchy comprises:
node information for a plurality of asset nodes, wherein the node information for at least one of the asset nodes includes metadata information from a metadata column of the table identified by user input; and
information associating a metric with one or more of the asset nodes.

11. A system comprising:
a memory; and
a processing device coupled with the memory to:
perform a search of data based at least in part on user-supplied criteria information, the data including operational machine data from one or more components of a system producing asset data;
cause display of at least a portion of a table, the table including a result of the search having a first column of asset identifier values and a second column of asset identifier values, each unique asset identifier value from among the first and second columns identifying a unique respective asset, and each of one or more unique asset identifier values having representation among the asset identifier values of the first column and among the asset identifier values of the second column;

receive user input indicating the first column as an asset identifier column and the second column as an asset parent identifier column; and create an asset hierarchy automatically based at least in part on the user input and the result of the search.

12. The system of claim 11 wherein the system producing asset data is an industrial control system.

13. The system of claim 11 wherein the system producing asset data is an industrial control system performing supervisory control and data acquisition (SCADA) processing.

14. The system of claim 11 wherein the system producing asset data is an industrial control system performing remote monitoring and control processing.

15. The system of claim 11 wherein the machine data is further from one or more components of a second system producing asset data.

16. The system of claim 11 wherein the machine data is further from one or more components of a second system producing asset data, and wherein the system producing asset data is an industrial control system and wherein the second system producing asset data is not an industrial control system.

17. The system of claim 11 wherein the asset hierarchy comprises node information for a plurality of asset nodes, the node information for each asset node comprising an asset identification.

18. The system of claim 11 wherein the asset hierarchy comprises node information for a plurality of asset nodes, the node information for each asset node comprising an asset identification and an association to a parent asset node.

19. The system of claim 11 wherein the asset hierarchy comprises:

node information for a plurality of asset nodes; and information associating a metric with one or more of the asset nodes.

20. The system of claim 11 wherein the asset hierarchy comprises:

node information for a plurality of asset nodes, wherein the node information for at least one of the asset nodes includes metadata information from a metadata column of the table identified by user input; and information associating a metric with one or more of the asset nodes.

21. A non-transitory computer readable storage medium encoding instructions thereon that, in response to execution by one or more processing devices, cause the one or more processing devices to perform operations comprising:

performing a search of data based at least in part on user-supplied criteria information, the data including operational machine data from one or more components of a system producing asset data;

causing display of at least a portion of a table, the table including a result of the search having a first column of asset identifier values and a second column of asset identifier values, each unique asset identifier value from among the first and second columns identifying a unique respective asset, and each of one or more unique asset identifier values having representation among the asset identifier values of the first column and among the asset identifier values of the second column;

receiving user input indicating the first column as an asset identifier column and the second column as an asset parent identifier column; and creating an asset hierarchy automatically based at least in part on the user input and the result of the search.

22. The computer readable storage medium of claim 21 wherein the system producing asset data is an industrial control system.

23. The computer readable storage medium of claim 21 wherein the system producing asset data is an industrial control system performing supervisory control and data acquisition (SCADA) processing.

24. The computer readable storage medium of claim 21 wherein the system producing asset data is an industrial control system performing remote monitoring and control processing.

25. The computer readable storage medium of claim 21 wherein the machine data is further from one or more components of a second system producing asset data.

26. The computer readable storage medium of claim 21 wherein the machine data is further from one or more components of a second system producing asset data, and wherein the system producing asset data is an industrial control system and wherein the second system producing asset data is not an industrial control system.

27. The computer readable storage medium of claim 21 wherein the asset hierarchy comprises node information for a plurality of asset nodes, the node information for each asset node comprising an asset identification.

28. The computer readable storage medium of claim 21 wherein the asset hierarchy comprises node information for a plurality of asset nodes, the node information for each asset node comprising an asset identification and an association to a parent asset node.

29. The computer readable storage medium of claim 21 wherein the asset hierarchy comprises:

node information for a plurality of asset nodes; and information associating a metric with one or more of the asset nodes.

30. The computer readable storage medium of claim 21 wherein the asset hierarchy comprises:

node information for a plurality of asset nodes, wherein the node information for at least one of the asset nodes includes metadata information from a metadata column of the table identified by user input; and information associating a metric with one or more of the asset nodes.

* * * * *